(12) United States Patent
Li et al.

(10) Patent No.: US 12,085,822 B2
(45) Date of Patent: Sep. 10, 2024

(54) DISPLAY PANEL, DISPLAY DEVICE, AND DRIVING METHOD THEREFOR

(71) Applicant: BOE Technology Group Co., Ltd., Beijing (CN)

(72) Inventors: Zhongxiao Li, Beijing (CN); Wenqing Zhao, Beijing (CN); Hui Zhang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 144 days.

(21) Appl. No.: 17/764,548

(22) PCT Filed: Jun. 9, 2021

(86) PCT No.: PCT/CN2021/099165
§ 371 (c)(1),
(2) Date: Mar. 29, 2022

(87) PCT Pub. No.: WO2022/022089
PCT Pub. Date: Feb. 3, 2022

(65) Prior Publication Data
US 2022/0413347 A1 Dec. 29, 2022

(30) Foreign Application Priority Data
Jul. 29, 2020 (CN) .......................... 202010745626.0

(51) Int. Cl.
*G02F 1/1362* (2006.01)
*G02B 27/00* (2006.01)
*G02F 1/1368* (2006.01)

(52) U.S. Cl.
CPC ... *G02F 1/136286* (2013.01); *G02B 27/0093* (2013.01); *G02F 1/136209* (2013.01); *G02F 1/136222* (2021.01); *G02F 1/1368* (2013.01)

(58) Field of Classification Search
CPC ......... G02F 1/136222; G02F 1/136286; G02F 1/136209; G02F 1/1368; G02B 27/0093
(Continued)

(56) References Cited

U.S. PATENT DOCUMENTS

2013/0265514 A1 10/2013 Li et al.
2014/0063382 A1 3/2014 Wu
(Continued)

FOREIGN PATENT DOCUMENTS

| CN | 102621757 A | 8/2012 |
| CN | 102629041 A | 8/2012 |

(Continued)

OTHER PUBLICATIONS

International Search Report for PCT/CN2021/099165 Mailed Aug. 24, 2021.
(Continued)

*Primary Examiner* — Christopher M Raabe
(74) *Attorney, Agent, or Firm* — Ling Wu; Stephen Yang; Ling and Yang Intellectual Property

(57) ABSTRACT

A display panel, a display device, and a driving method therefor, the display panel comprising: a plurality of sub-pixels arranged in an array, and the display panel comprising: a first substrate and a second substrate disposed opposite each other, wherein the first substrate comprises a first base and a plurality of pixel electrodes disposed on the first base, and each sub-pixel comprises at least two pixel electrodes.

9 Claims, 13 Drawing Sheets

(58) Field of Classification Search
USPC .......................................................... 349/33
See application file for complete search history.

(56) References Cited

U.S. PATENT DOCUMENTS

| | | |
|---|---|---|
| 2014/0146255 A1 | 5/2014 | Xie et al. |
| 2014/0146261 A1 | 5/2014 | Wu |
| 2017/0003790 A1 | 1/2017 | Gao |
| 2017/0059942 A1* | 3/2017 | Son .................. G02F 1/133753 |
| 2019/0324329 A1* | 10/2019 | Chong .............. G02F 1/136286 |
| 2020/0159015 A1 | 5/2020 | Kusafuka |

FOREIGN PATENT DOCUMENTS

| | | |
|---|---|---|
| CN | 102629607 A | 8/2012 |
| CN | 202443185 U | 9/2012 |
| CN | 102799035 A | 11/2012 |
| CN | 102830558 A | 12/2012 |
| CN | 103676355 A | 3/2014 |
| CN | 104102055 A | 10/2014 |
| CN | 107765438 A | 3/2018 |
| CN | 110799894 A | 2/2020 |
| CN | 111752052 A | 10/2020 |
| JP | 2006-292854 A | 10/2006 |

OTHER PUBLICATIONS

The First Office Action dated Sep. 16, 2021 for Chinese Patent Application No. 202010745626.0 and English Translation.

\* cited by examiner

DISPLAY PANEL, DISPLAY DEVICE, AND DRIVING METHOD THEREFOR

CROSS-REFERENCE TO RELATED APPLICATIONS

The present application is a U.S. National Phase Entry of International Application No. PCT/CN2021/099165 having an international filing date of Jun. 9, 2021, which claims priority to Chinese Patent Application No. 202010745626.0, filed with the CNIPA on Jul. 29, 2020 and entitled "Display Panel, Display Device, and Driving Method Therefor". The entire contents of the above-identified applications are hereby incorporated by reference.

TECHNICAL FIELD

The present disclosure relates to, but is not limited to, the field of display technology, particularly to a display panel, a display apparatus and a driving method therefor.

BACKGROUND

Liquid Crystal Displays (LCDs), which are flat panel display apparatuses, are increasingly applied in the field of high performance display due to their characteristics such as small size, low power consumption, no radiation and relatively low production cost. In recent years, three-dimensional display technology is developing rapidly, and has become a hot spot for research.

The liquid crystal displays can realize three-dimensional display. The liquid crystal displays provide different picture information for different human eyes in three-dimensional display, and provide a sense of dynamic parallax for human eyes.

SUMMARY

The following is a summary about the subject matter described herein in detail. The summary is not intended to limit the protection scope of the claims.

In a first aspect, the present disclosure provides a display panel, including a plurality of sub-pixels arranged in an array, the display panel including a first substrate and a second substrate which are arranged opposite to each other; the first substrate including a first base substrate and a plurality of pixel electrodes arranged on the first base substrate; and each sub-pixel including at least two pixel electrodes.

In one possible implementation, a plurality of sub-pixels constitute one pixel; the second substrate includes a second base substrate and a color filter layer arranged on the second base substrate, the color filter layer including a plurality of optical filters arranged in a matrix; each sub-pixel further includes an optical filter of a planar structure; and optical filters of a plurality of sub-pixels located in the same pixel have different colors; and in each sub-pixel, an orthographic projection of the optical filter on the first base substrate overlaps at least partially with an orthographic projection of each pixel electrode on the first base substrate.

In one possible implementation, the first substrate further includes an array structure layer arranged on one side of the pixel electrodes close to the first base substrate; the array structure layer includes a plurality of transistors in a one-to-one correspondence with the pixel electrodes, the pixel electrodes being electrically connected to the corresponding transistors; and each sub-pixel further includes transistors corresponding to the at least two pixel electrodes.

In one possible implementation, the second substrate further includes a black matrix layer, a first adhesive layer and a common electrode, which are arranged on the second base substrate and are arranged in the same layer as the color filter layer, the black matrix layer including a plurality of black matrix structures; each sub-pixel further includes a black matrix structure provided with an opening area, the optical filter being located in the opening area and the black matrix structures of adjacent sub-pixels being connected to each other; in each sub-pixel, an orthographic projection of the black matrix structure on the first base substrate covers orthographic projections of all the transistors on the first base substrate, and the orthographic projection of the black matrix structure on the first base substrate overlaps at least partially with the orthographic projection of each pixel electrode on the first base substrate; and the first adhesive layer is arranged on one side of the color filter layer close to the first substrate, and the common electrode is arranged on one side of the first adhesive layer close to the first substrate.

In one possible implementation, the first substrate further includes a plurality of data signal lines extending along a first direction and a plurality of scan signal lines extending along a second direction, which are arranged on the first base substrate; and an orthographic projection of the black matrix layer on the first base substrate covers orthographic projections of the data signal lines and the scan signal lines on the first base substrate, the first direction being perpendicular to the second direction.

In one possible implementation, the plurality of pixel electrodes in each sub-pixel are arranged along the first direction; each pixel electrode is in a shape of a broken line, and includes a first connecting portion and a second connecting portion, the first connecting portion and the second connecting portion being both linear and being an integrally formed structure, the second connecting portion extending along the second direction; the first connecting portion is connected to the transistor corresponding to the pixel electrode, and the orthographic projection of the black matrix structure on the first base substrate covers an orthographic projection of the first connecting portion on the first base substrate; an orthographic projection of the second connecting portion on the first base substrate overlaps at least partially with the orthographic projection of the optical filter on the first base substrate, and the orthographic projection of the second connecting portion on the first base substrate overlaps at least partially with the orthographic projection of the black matrix structure on the first base substrate; and a width of the second connecting portion of each pixel electrode along the first direction is 1.3 microns to 1.7 microns.

In one possible implementation, each sub-pixel is electrically connected to two scan signal lines and M data signal lines respectively, the two scan signal lines are a first scan signal line and a second scan signal line respectively, the M data signal lines are a first data signal line to an Mth data signal line respectively, the plurality of pixel electrodes arranged along the first direction in each sub-pixel are a first pixel electrode to a 2Mth pixel electrode sequentially, and a transistor corresponding to an ith pixel electrode is an ith transistor; the optical filter in each sub-pixel is an axisymmetric structure, and symmetry axes of the optical filter include a first symmetry axis and a second symmetry axis, the first symmetry axis extending along the first direction and the second symmetry axis extending along the second direction; a first transistor to an Mth transistor are arranged along the second direction, an M+1th transistor to a 2Mth transistor are arranged along the second direction, a jth transistor and a j+Mth transistor are arranged along the first direction, and the jth transistor and the j+Mth transistor are mirror-symmetrical with respect to the second symmetry axis; the first scan signal line is connected to gate electrodes of the first transistor to the Mth transistor respectively; the second scan signal line is electrically connected to gate electrodes of the M+1th transistor to the 2Mth transistor respectively, and the first scan signal line and the second scan signal line are mirror-symmetrical with respect to the second symmetry axis and are located at a first side and a second side of the optical filter respectively, the first side and the second side being opposite to each other; and the M data signal lines are located at a third side of the optical filter, the third side being different from the first side and the second side, and a jth data signal line is electrically connected to source electrodes of the jth transistor and the j+Mth transistor respectively, M≥1, 1≤i≤2M, and 1≤j≤M.

In one possible implementation, all pixel electrodes in each sub-pixel are arranged in the same layer; and a distance between the second connecting portions of adjacent pixel electrodes is 1.4 microns to 1.6 microns.

In one possible implementation, in each sub-pixel, a pixel electrode of an odd ordinal number is arranged in a different layer from a pixel electrode of an even ordinal number; a spacing between an orthographic projection of the ith pixel electrode on the first base substrate and an orthographic projection of an i+1th pixel electrode on the first base substrate is equal to 0; the first substrate further includes a first planarization layer and a second planarization layer; the first planarization layer is located on one side of the array structure layer away from the first base substrate, and the second planarization layer is located on one side of the first planarization layer away from the first base substrate; the pixel electrode of an odd ordinal number is located between the first planarization layer and the second planarization layer, and the pixel electrode of an even ordinal number is located on one side of the second planarization layer away from the first base substrate; or the pixel electrode of an even ordinal number is located between the first planarization layer and the second planarization layer, and the pixel electrode of an odd ordinal number is located on one side of the second planarization layer away from the first base substrate.

In one possible implementation, the display panel further includes: a spacer and a liquid crystal layer, which are arranged between the first substrate and the second substrate, a first polarizer and a second polarizer; an absolute value of a difference between a refractive index of a manufacturing material of the liquid crystal layer for extraordinary light and a refractive index of the manufacturing material of the liquid crystal layer for ordinary light is greater than or equal to 0.3; the first polarizer is arranged on one side of the first substrate away from the second substrate, and the second polarizer is arranged on one side of the second substrate away from the first substrate; and a polarization direction of the first polarizer is perpendicular to a polarization direction of the second polarizer.

In a second aspect, the present disclosure further provides a display apparatus, including an optical element array, an eyeball tracking structure and the display panel described above; the display panel is configured to emit light towards the optical element array, such that the light passes through the optical element array and then reaches human eyes; the optical element array is located at a light exiting side of the display panel; and the eyeball tracking structure is electrically connected to the display panel and is configured to acquire position information of the human eyes.

In one possible implementation, the display panel includes a plurality of sub-pixels, and the optical element array includes a plurality of microlenses; a dimension of a microlens along the first direction is less than or equal to a dimension of a sub-pixel along the first direction, and a dimension of the microlens along the second direction is less than or equal to a dimension of the sub-pixel along the second direction.

In a third aspect, the present disclosure further provides a method for driving a display apparatus, which is used for driving the display apparatus described above, the display apparatus including a plurality of pixel electrodes, the method including: acquiring position information of human eyes; and providing a driving signal to the plurality of pixel electrodes according to the position information of the human eyes.

In one possible implementation, when all pixel electrodes in each sub-pixel are arranged in the same layer, the display apparatus includes a plurality of electrode control regions and a plurality of electrode transition regions, the plurality of electrode control regions and the plurality of electrode transition regions are arranged in a staggered manner, each of the electrode control regions includes a pixel electrode, and the electrode transition regions are in a one-to-one correspondence with intervals between adjacent pixel electrodes; an area viewed by the human eyes is a visual area, the visual area includes a plurality of view angle control regions and a plurality of view angle transition regions; and the plurality of view angle control regions and the plurality of view angle transition regions are arranged in a staggered manner; the view angle control regions are in a one-to-one correspondence with the electrode control regions, and the view angle control regions are areas formed by light emitted from the corresponding electrode control regions after transmission through the optical element array; the view angle transition regions are in a one-to-one correspondence with the electrode transition regions, and the view angle transition regions are areas formed by light emitted from the corresponding electrode transition regions after transmission through the optical element array; the position information includes a view angle control region or a view angle transition region; the human eyes include a first eyeball and a second eyeball, and the providing a driving signal to the plurality of pixel electrodes according to the position information of the human eyes includes: when either of the eyeballs is located in a view angle control region, providing a corresponding driving signal to the pixel electrode included in the electrode control region corresponding to the view angle control region in which the eyeball is located, or when either of the eyeballs is located in a view angle transition region, providing the same driving signals to the pixel electrodes included in the electrode control regions at both sides of the electrode transition region corresponding to the view angle transition region in which the eyeball is located.

In one possible implementation, when a pixel electrode of an odd ordinal number is arranged in a different layer from a pixel electrode of an even ordinal number in each sub-pixel, the display apparatus includes a plurality of electrode control regions each including a pixel electrode, and an area viewed by the human eyes is a visual area, the visual area including a plurality of view angle control regions; the view angle control regions are in a one-to-one correspondence with the electrode control regions, and the view angle control regions are areas formed by light emitted from the corresponding electrode control regions after transmission through the optical element array; the human eyes include a first eyeball and a second eyeball, and the providing a driving signal to the plurality of pixel electrodes according to the position information of the human eyes includes: when either of the eyeballs is located between two view angle control regions, providing corresponding driving signals to the pixel electrodes included in the electrode control regions corresponding to the two view angle control regions between which the eyeball is located, wherein an absolute value of a difference between voltages of the corresponding driving signals provided to the pixel electrodes included in the electrode control regions corresponding to the two view angle control regions between which the eyeball is located is less than or equal to a threshold difference; or when either of the eyeballs is located in a view angle control region, providing a corresponding driving signal to the pixel electrode included in the electrode control region corresponding to the view angle control region in which the eyeball is located.

In one possible implementation, the providing a driving signal to the plurality of pixel electrodes includes: providing a same driving signal to the plurality of pixel electrodes.

Other aspects will become apparent upon reading and understanding the drawings and detailed description.

BRIEF DESCRIPTION OF DRAWINGS

Accompanying drawings are used for providing an understanding of technical solutions of the present disclosure and form a part of the specification, are used for explaining the technical solutions of the present disclosure together with embodiments of the present disclosure, and do not constitute a limitation on the technical solutions of the present disclosure.

DETAILED DESCRIPTION

Figure 1:
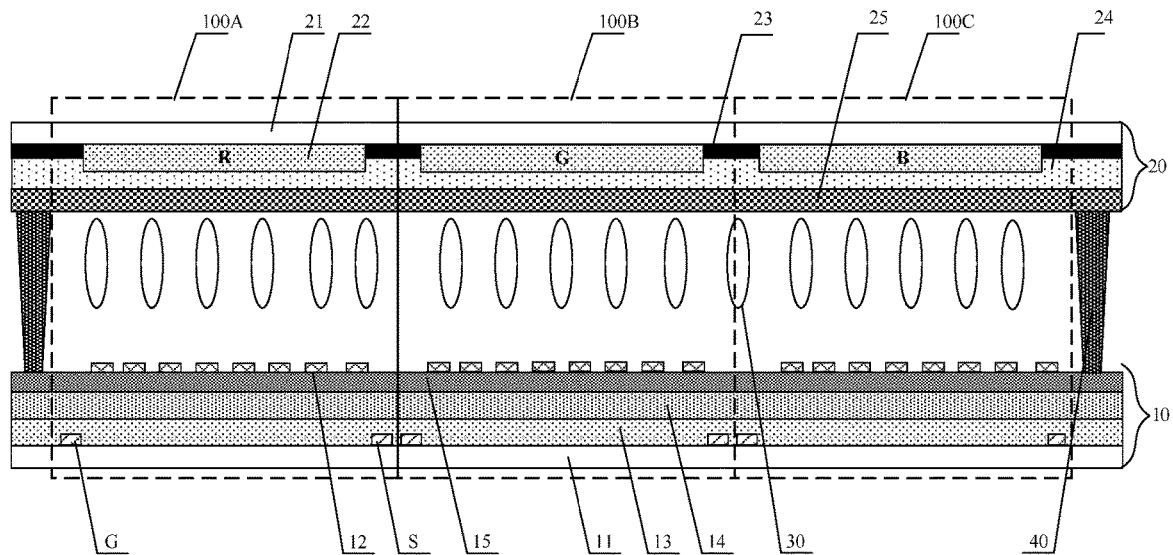
FIG. 1 is a sectional view of a display panel in accordance with an embodiment of the present disclosure.

Embodiments of the present disclosure will be described below in detail with reference to the accompanying drawings. The embodiments in the present disclosure and features in the embodiments may be combined with each other arbitrarily if there is no conflict.

A plurality of embodiments are described in the present disclosure, but the description is exemplary rather than limiting, and for those of ordinary skills in the art, there may be more embodiments and implementation solutions within the scope of the embodiments described in the present disclosure. Although many possible combinations of features are shown in the drawings and discussed in the Detailed Description, many other combinations of the disclosed features are also possible. Unless specifically limited, any feature or element of any embodiment may be used in combination with or in place of any other feature or element of any other embodiment.

The present disclosure includes and contemplates combinations with features and elements known to those of ordinary skills in the art. Embodiments, features and elements already disclosed in this disclosure may also be combined with any conventional features or elements to form a technical solution defined by the claims. Any feature or element of any embodiment may also be combined with features or elements from other technical solutions to form another technical solution defined by the claims. Therefore, it should be understood that any of the features shown and/or discussed in the present disclosure may be implemented individually or in any suitable combination. Therefore, the embodiments are not otherwise limited except in accordance with the appended claims and equivalents thereof. In addition, various modifications and changes may be made within the protection scope of the appended claims.

Unless otherwise defined, technical terms or scientific terms used in the present disclosure shall have common meanings as construed by those of ordinary skills in the art to which the present disclosure pertains. The words "first", "second" and the like used in the present disclosure do not represent any order, quantity or importance, but are merely used to distinguish among different components. Similar words such as "including" or "comprising" mean that elements or articles preceding the words cover elements or articles listed after the words and their equivalents, and do not exclude other elements or articles. Similar terms such as "connect" or "link" are not limited to physical or mechanical connections, but may include electrical connections, whether direct or indirect. "Up", "down", "left", "right", etc. are only used to represent a relative position relationship that may change accordingly when an absolute position of an object being described changes.

When a three-dimensional liquid crystal display apparatus carries out three-dimensional display, picture information provided for human eyes is called views. As the human eyes move, the views also change. As the resolution of the three-dimensional liquid crystal display apparatus is not high, intervals between different views in a three-dimensional space are relatively large, making it impossible to provide a relatively good sense of dynamic parallax for the human eyes, and decreasing the stereoscopic experience. When people sit on a train, they feel that mountains in the distance are not moving, while trees in the near distance are moving rapidly. This is caused by dynamic parallax. People may distinguish different distances of objects based on dynamic observation.

Figure 2:
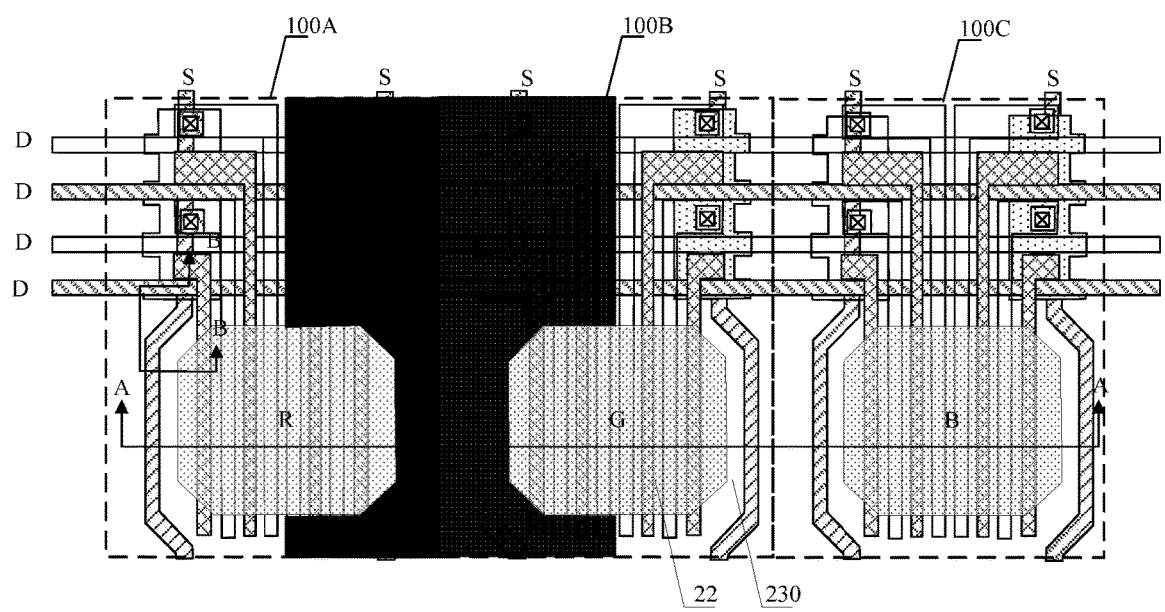
FIG. 2 is a top view corresponding to FIG. 1.

FIG. 1 is a sectional view of a display panel in accordance with an embodiment of the present disclosure, and FIG. 2 is a top view corresponding to FIG. 1. As shown in FIGS. 1 and 2, the display panel in accordance with an embodiment of the present disclosure includes a plurality of sub-pixels arranged in an array. The display panel includes a first substrate 10 and a second substrate 20 which are arranged opposite to each other. The first substrate 10 includes a first base substrate 11 and a plurality of pixel electrodes 12 arranged on the first base substrate. Each sub-pixel includes at least two pixel electrodes 12. FIG. 1 illustrates an example in which there are three sub-pixels 100A to 100C.

In an exemplary embodiment, the number of sub-pixels included in the display panel is determined according to the size and model of the display panel. Only three sub-pixels are illustrated in the display panels in FIGS. 1 and 2, but the embodiments of the present disclosure are not limited thereto. FIG. 1 is a sectional view taken along a direction A-A in FIG. 2.

In an exemplary embodiment, the first substrate may be an array substrate and the second substrate may be a color filter substrate.

In an exemplary embodiment, the first base substrate 11 may be a rigid base substrate or a flexible base substrate. The rigid base substrate may be made of, but not limited to, one or more of glass and metal foils. The flexible base substrate may be made of, but not limited to, one or more of polyethylene terephthalate, ethylene terephthalate, polyether ether ketone, polystyrene, polycarbonate, polyarylate, polyarylester, polyimide, polyvinyl chloride, polyethylene and textile fibers.

In an exemplary embodiment, the number of pixel electrodes 12 included in each sub-pixel may be determined according to the number of view angles and the resolution provided by the display panel. FIGS. 1 and 2 illustrate an example in which each sub-pixel includes 8 pixel electrodes.

In an exemplary embodiment, the pixel electrode 12 is a transparent electrode, which may ensure the display effect of the display panel.

The display panel in accordance with an embodiment of the present disclosure includes a plurality of sub-pixels arranged in an array, and the display panel includes a first substrate and a second substrate which are arranged opposite to each other; the first substrate includes a first base substrate and a plurality of pixel electrodes arranged on the first base substrate; and each sub-pixel includes at least two pixel electrodes. In the present disclosure, each sub-pixel includes at least two pixel electrodes, so that the at least two pixel electrodes in each sub-pixel may be arranged more closely, which improves the resolution of the display panel, thus improving the sense of dynamic parallax of human eyes, and enhancing the stereoscopic experience.

In an exemplary embodiment, as shown in FIGS. 1 and 2, the second substrate 20 includes a second base substrate 21 and a color filter layer disposed on the second base substrate 21, the color filter layer including a plurality of optical filters 22 arranged in a matrix. The optical filter 22 is a planar structure. In each sub-pixel, an orthographic projection of each optical filter 22 on the first base substrate 11 overlaps at least partially with an orthographic projection of each pixel electrode 12 on the first base substrate 11.

In an exemplary embodiment, the optical filter 22 may be one of a red optical filter, a blue optical filter or a green optical filter, and the color of the optical filter is the same as the color of the sub-pixel.

In an exemplary embodiment, the second base substrate 21 may be a rigid base substrate or a flexible base substrate. The rigid base substrate may be made of, but not limited to, one or more of glass and metal foils. The flexible base substrate may be made of, but not limited to, one or more of polyethylene terephthalate, ethylene terephthalate, polyether ether ketone, polystyrene, polycarbonate, polyarylate, polyarylester, polyimide, polyvinyl chloride, polyethylene and textile fibers.

In an exemplary embodiment, a plurality of sub-pixels constitute a pixel. In an exemplary embodiment, the number of sub-pixels included in each pixel is determined according to the display requirement of the display panel. The number of sub-pixels included in each pixel may be 3, and they may be, for example, a red sub-pixel R, a green sub-pixel G and a blue sub-pixel B. The number of sub-pixels included in each pixel may be 4, and they may be, for example, a red sub-pixel, a green sub-pixel, a blue sub-pixel and a yellow sub-pixel. FIGS. 1 and 2 illustrate an example in which each pixel includes three sub-pixels.

In an exemplary embodiment, the number of pixel electrodes in each sub-pixel is the number of view angles provided by the display panel.

Figure 3:
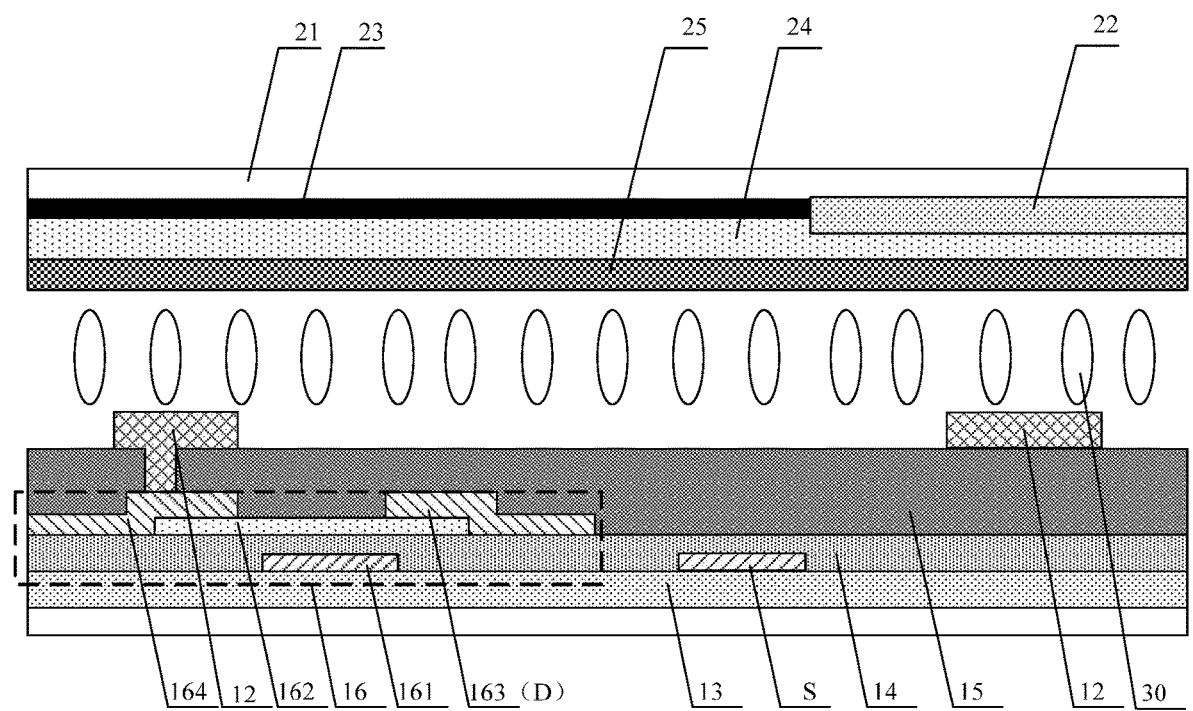
FIG. 3 is a sectional view taken along a direction B-B in FIG. 2.

FIG. 3 is a sectional view taken along a direction B-B in FIG. 2. As shown in FIG. 3, in an exemplary embodiment, the first substrate further includes an array structure layer. The array structure layer is arranged on one side of the pixel electrodes close to the first base substrate. The array structure layer includes a plurality of transistors 16. The transistors 16 are in a one-to-one correspondence with the pixel electrodes 12. The pixel electrodes are electrically connected to the corresponding transistors. Each sub-pixel further includes transistors corresponding to the at least two pixel electrodes.

As shown in FIG. 3, the transistor 16 includes a gate electrode 161, an active layer 162, a source electrode 163 and a drain electrode 164. In an exemplary embodiment, the transistor 16 may be a low temperature polysilicon thin film transistor or a metal oxide transistor. In an exemplary embodiment, the transistor 16 may be a top gate structure or a bottom gate structure. FIG. 3 illustrates an example in which the transistor 16 is a bottom gate structure.

In an exemplary embodiment, the pixel electrodes are electrically connected to the drain electrodes of the corresponding transistors.

In an exemplary embodiment, a manufacturing material of the active layer may be low temperature polysilicon or a metal oxide.

In an exemplary embodiment, when the active layer is made of a metal oxide, the active layer may be made of an oxide containing indium and tin, an oxide containing tungsten and indium, an oxide containing tungsten, indium and zinc, an oxide containing titanium and indium, an oxide containing titanium, indium and tin, an oxide containing indium and zinc, an oxide containing silicon, indium and tin, and an oxide containing indium, gallium and zinc.

In an exemplary embodiment, the active layer may be mono-layered, double-layered or multi-layered.

As shown in FIGS. 1 and 3, the second substrate further includes a black matrix layer 23, a first adhesive layer 24 and a common electrode 25, which are arranged on the second base substrate and are arranged in the same layer as the color filter layer, the black matrix layer 23 including a plurality of black matrix structures 230. Each sub-pixel further includes a black matrix structure provided with an opening area, the optical filter 22 being located in the opening area. The black matrix structures of adjacent sub-pixels are connected to each other, i.e., the optical filters of adjacent sub-pixels have a black matrix layer therebetween.

In an exemplary embodiment, the first adhesive layer 24 is arranged on one side of the color filter layer close to the first substrate 10, and the common electrode 25 is arranged on one side of the first adhesive layer 24 close to the first substrate 10.

In an exemplary embodiment, an aperture ratio of each sub-pixel may be about 30% to 31%. For example, the aperture ratio of each sub-pixel may be 30.6%.

As shown in FIGS. 1 to 3, an orthographic projection of the black matrix structure 230 on the first base substrate 11 covers orthographic projections of all the transistors 16 on the first base substrate 11, and the orthographic projection of the black matrix structure 230 on the first base substrate 11 overlaps at least partially with an orthographic projection of each pixel electrode 12 on the first base substrate 11.

In an exemplary embodiment, the common electrode 25 may be a transparent electrode. A manufacturing material of the transparent electrode may be indium tin oxide or zinc tin oxide.

In an exemplary embodiment, the common electrode 25 may be a planar electrode and an orthographic projection of the common electrode 25 on the first base substrate 11 covers an orthographic projection of the pixel electrode 12 on the first base substrate 11.

As shown in FIGS. 1 to 3, in an exemplary embodiment, the first substrate further includes a plurality of data signal lines D extending along a first direction and a plurality of scan signal lines S extending along a second direction, which are arranged on the first base substrate 11.

The orthographic projection of the black matrix layer 23 on the first base substrate 11 covers orthographic projections of the data signal lines D and the scan signal lines S on the first base substrate 11, the first direction being perpendicular to the second direction. The black matrix layer 23 shields the signal lines, which may prevent cross-color between the sub-pixels.

Figure 4:
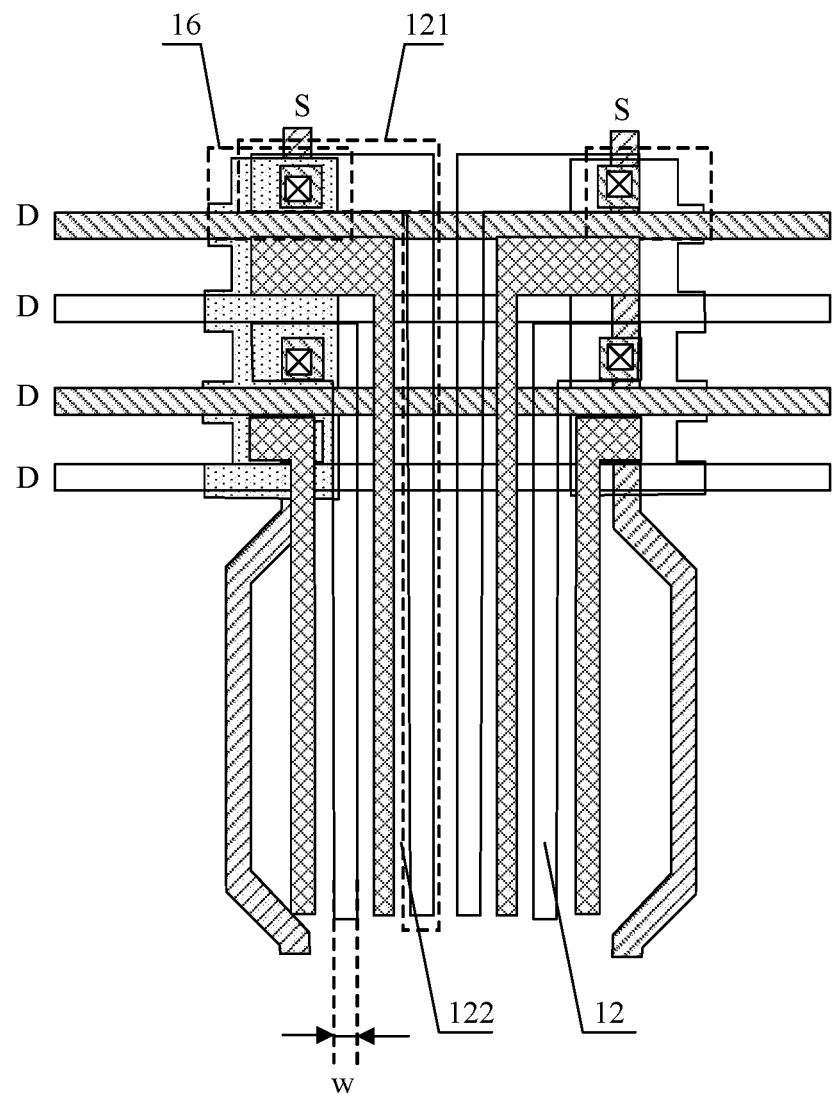
FIG. 4 is a top view of a display panel in accordance with an exemplary embodiment.

FIG. 4 is a top view of a display panel in accordance with an exemplary embodiment. As shown in FIG. 4, the plurality of pixel electrodes 12 in each sub-pixel are arranged along the first direction. FIG. 4 illustrates an example of one sub-pixel, only the array structure layer and the pixel electrodes being shown in the sub-pixel.

As shown in FIG. 4, in an exemplary embodiment, each pixel electrode 12 is in a shape of a broken line, and includes a first connecting portion 121 and a second connecting portion 122, the first connecting portion 121 and the second connecting portion 122 being both linear and being an integrally formed structure, the second connecting portion 122 extending along the second direction.

As shown in FIG. 4, the first connecting portion 121 is connected to the transistor 16 corresponding to the pixel electrode.

As shown in FIG. 2, in each sub-pixel, the orthographic projection of the black matrix structure 230 on the first base substrate 11 covers an orthographic projection of the first connecting portion 121 on the first base substrate 11. An orthographic projection of the second connecting portion 122 on the first base substrate 11 overlaps at least partially with an orthographic projection of the optical filter 22 on the first base substrate 11, and the orthographic projection of the second connecting portion 122 on the first base substrate 11 overlaps at least partially with the orthographic projection of the black matrix structure 230 on the first base substrate 11.

In an exemplary embodiment, a width of the second connecting portion 122 of each pixel electrode along the first direction may be about 1.3 microns to 1.7 microns.

In an exemplary embodiment, the width w of the second connecting portion 122 of each pixel electrode along the first direction may be about 1.5 microns.

Figure 5:
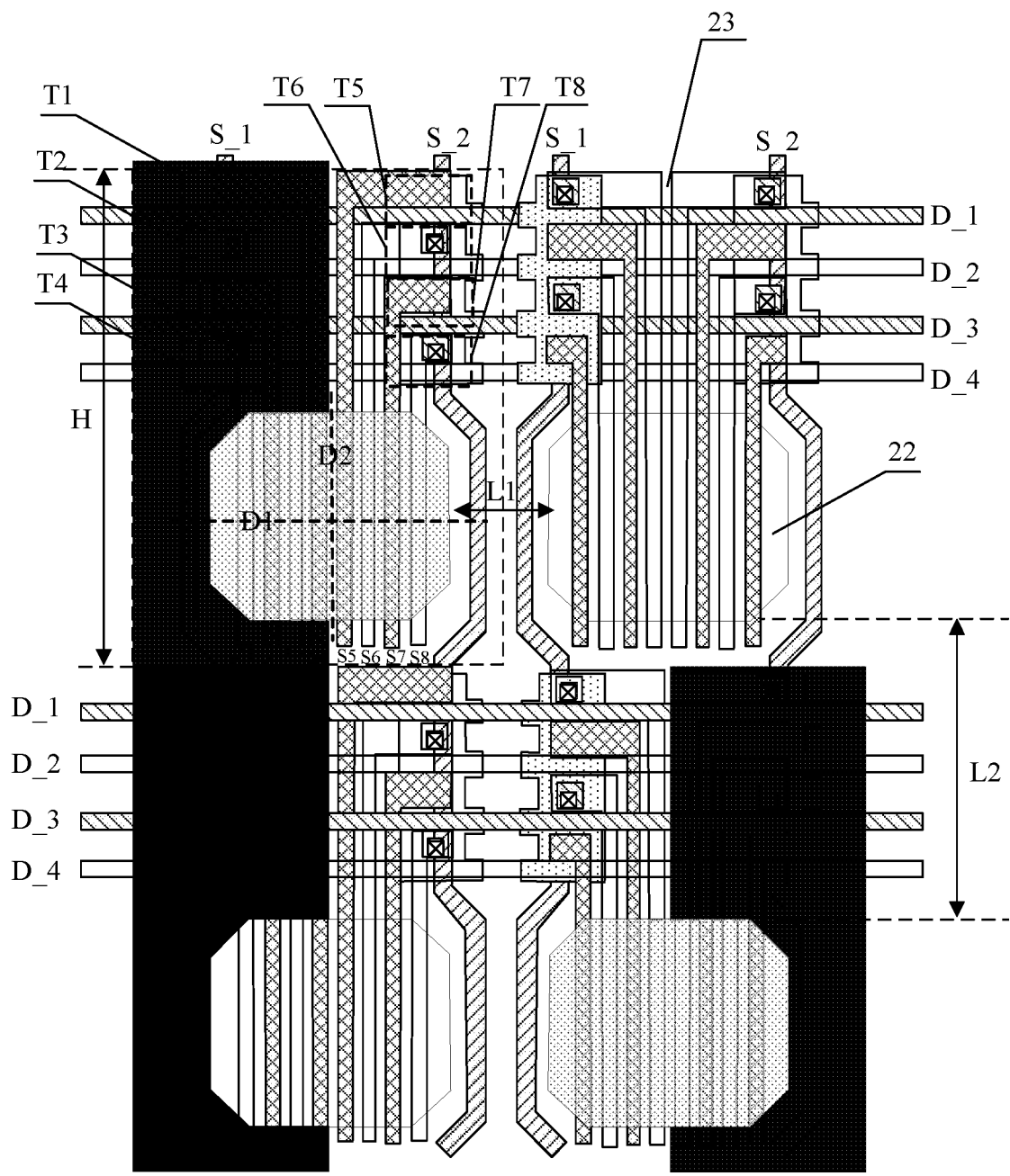
FIG. 5 is a schematic diagram of a structure of a display panel in accordance with an exemplary embodiment.

FIG. 5 is a schematic diagram of a structure of a display panel in accordance with an exemplary embodiment. As shown in FIG. 5, in a display panel in accordance with an exemplary embodiment, each sub-pixel is electrically connected to two scan signal lines and M data signal lines respectively, the two scan signal lines are a first scan signal line S_1 and a second scan signal line S_2 respectively, the M data signal lines are a first data signal line D_1 to an Mth data signal line D_M respectively, the plurality of pixel electrodes arranged along the first direction in each sub-pixel are a first pixel electrode S1 to a 2Mth pixel electrode S2M sequentially, and a transistor corresponding to an ith pixel electrode Si is an ith transistor Ti. The optical filter 22 in each sub-pixel is an axisymmetric structure, and symmetry axes of the optical filter include a first symmetry axis D1 and a second symmetry axis D2, the first symmetry axis D1 extending along the first direction and the second symmetry axis D2 extending along the second direction;

A first transistor T1 to an Mth transistor TM are arranged along the second direction, an M+1th transistor TM+1 to a 2Mth transistor T2M are arranged along the second direction, a jth transistor and a j+Mth transistor are arranged along the first direction, and the jth transistor and the j+Mth transistor are mirror-symmetrical with respect to the second symmetry axis.

The first scan signal line S_1 is connected to gate electrodes of the first transistor to the Mth transistor respectively; the second scan signal line S_2 is electrically connected to gate electrodes of the M+1th transistor to the 2Mth transistor respectively, and the first scan signal line S_1 and the second scan signal line S_2 are mirror-symmetrical with respect to the second symmetry axis D2 and are located at a first side and a second side of the optical filter 22 respectively, the first side and the second side being opposite to each other.

The M data signal lines D_1 to D_M are located at a third side of the optical filter 22, the third side being different from the first side and the second side, and the jth data signal line D_i is electrically connected to source electrodes of the jth transistor and the j+Mth transistor respectively, $1 \leq i \leq 2M$ and $1 \leq j \leq M$.

In an exemplary embodiment, the optical filter is in a shape of a polygon, which may be, for example, a hexagon.

In an exemplary embodiment, a ratio of a distance L1 between two adjacent optical filters arranged along the first direction to a distance L2 between two adjacent optical filters arranged along the second direction is ½ or ⅔.

In an exemplary embodiment, the distance L1 between two adjacent optical filters arranged along the first direction may be determined according to the resolution of the display panel.

In an exemplary embodiment, the distance L2 between two adjacent optical filters arranged along the second direction may be determined according to the resolution of the display panel.

In an exemplary embodiment, $M \geq 1$. The value of M is determined according to the number of view angles that the display panel can provide. FIG. 5 illustrates an example in which M=4.

In an exemplary embodiment, the data signal lines connected to the plurality of sub-pixels, which are arranged along the first direction, are identical; and the scan signal lines connected to the plurality of sub-pixels, which are arranged along the second direction, are identical.

In an exemplary embodiment, the orthographic projection of the first connecting portion on the first base substrate overlaps at least partially with an orthographic projection of the drain electrode of the transistor corresponding to the pixel electrode on the first base substrate.

Figure 6:
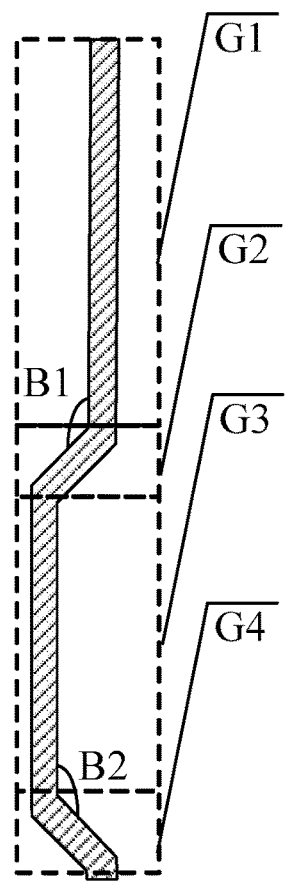
FIG. 6 is a schematic diagram of a structure of a scan signal line located in each sub-pixel in accordance with an exemplary embodiment.

FIG. 6 is a schematic diagram of a structure of a scan signal line located in each sub-pixel in accordance with an exemplary embodiment. As shown in FIG. 6, the scan signal line located in each sub-pixel includes a first scanning portion G1, a second scanning portion G2, a third scanning portion G3 and a fourth scanning portion G4. The first scanning portion G1 and the third scanning portion G3 extend along the second direction.

One end of the first scanning portion G1 is connected to one end of the second scanning portion G2, the first scanning portion G1 and the gate electrode of the transistor connected to the scan signal line are an integrally formed structure, and an included angle B1 between the first scanning portion and the second scanning portion is greater than 90 degrees and smaller than 180 degrees.

The other end of the second scanning unit G2 is connected to one end of the third scanning unit G3; the other end of the third scanning portion G3 is connected to one end of the fourth scanning portion G4, and an included angle between the third scanning portion G3 and the fourth scanning portion G4 is greater than 90 degrees and smaller than 180 degrees.

In a case where a sub-pixel has an adjacent sub-pixel along the second direction, the other end of the first scanning portion of the sub-pixel is connected to the fourth scanning portion of the adjacent sub-pixel, and the other end of the fourth scanning portion of the sub-pixel is connected to the first scanning portion of the adjacent sub-pixel.

As shown in FIGS. 1 and 3, the array structure layer in a display panel in accordance with an exemplary embodiment includes a first insulating layer 13, a first metal layer, a second insulating layer 14, an active layer, and a second metal layer disposed along a direction perpendicular to the first base substrate.

The first metal layer includes the gate electrodes of all the transistors and the scan signal lines, the active layer includes the active layers of all the transistors, and the second metal layer includes the source and drain electrodes of all the transistors and the data signal lines.

In an exemplary embodiment, as shown in FIG. 1, all pixel electrodes in each sub-pixel are arranged in the same layer.

In an exemplary embodiment, when all pixel electrodes in each sub-pixel are arranged in the same layer, a distance between the second connecting portions of adjacent pixel electrodes is 1.4 microns to 1.6 microns. In an exemplary embodiment, the distance between the second connecting portions of adjacent pixel electrodes is 1.5 microns.

In an exemplary embodiment, as shown in FIGS. 1 and 3, the first substrate further includes a planarization layer 15. The planarization layer 15 is disposed between the array structure layer and the pixel electrodes.

When the transmittance of the display panel is considered, an aperture ratio of the sub-pixel may be adjusted by increasing the length L of the sub-pixel along the second direction, but it should be ensured that the size of each sub-pixel is below the human eye's resolution limit, that is, a flare angle of the sub-pixel for the human eyes is below $1/60$ degrees. Taking a mobile phone product as an example, when a viewing distance between the human eyes and the display panel is 30 cm and the human eye's resolution limit is 87 microns, the length L of the sub-pixel along the second direction can be less than 87 microns.

Figure 7:
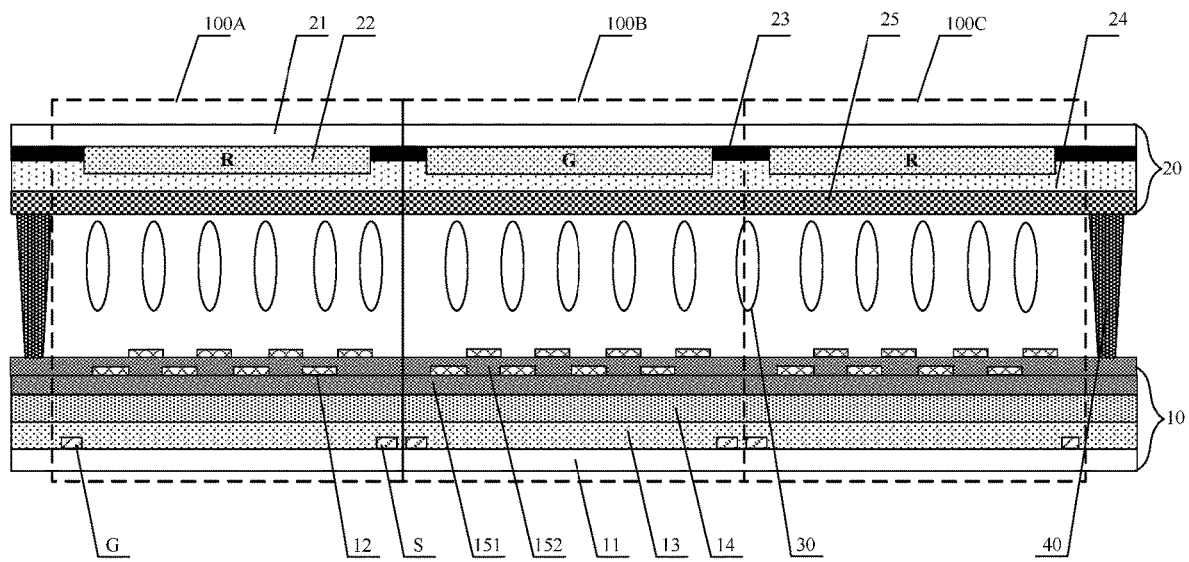
FIG. 7 is a schematic diagram of a structure of a display panel in accordance with an exemplary embodiment.

FIG. 7 is a schematic diagram of a structure of a display panel in accordance with an exemplary embodiment. As shown in FIG. 7, pixel electrodes of odd ordinal numbers are arranged in a different layer from pixel electrodes of even ordinal numbers. A spacing between an orthographic projection of the ith pixel electrode on the first base substrate and an orthographic projection of an i+1th pixel electrode on the first base substrate is equal to or approximatively equal to 0. The double-layer structure of the pixel electrodes shown in FIG. 7 can increase the coverage density of the pixel electrodes and enable more accurate adjustment and control of the display effect.

As shown in FIG. 7, in an exemplary embodiment, the first substrate further includes a first planarization layer 151 and a second planarization layer 152. The first planarization layer 151 is located on one side of the array structure layer away from the first base substrate 11, and the second planarization layer 152 is located on one side of the first planarization layer 151 away from the first base substrate 11. The pixel electrode of an odd ordinal number is located between the first planarization layer and the second planarization layer, and the pixel electrode of an even ordinal number is located on one side of the second planarization layer away from the first base substrate; or the pixel electrode of an even ordinal number is located between the first planarization layer and the second planarization layer, and the pixel electrode of an odd ordinal number is located on the side of the second planarization layer away from the first base substrate. FIG. 7 illustrates an example in which the pixel electrode of an odd ordinal number is located between the first planarization layer and the second planarization layer and the pixel electrode of an even ordinal number is located on one side of the second planarization layer away from the first base substrate.

Figure 8:
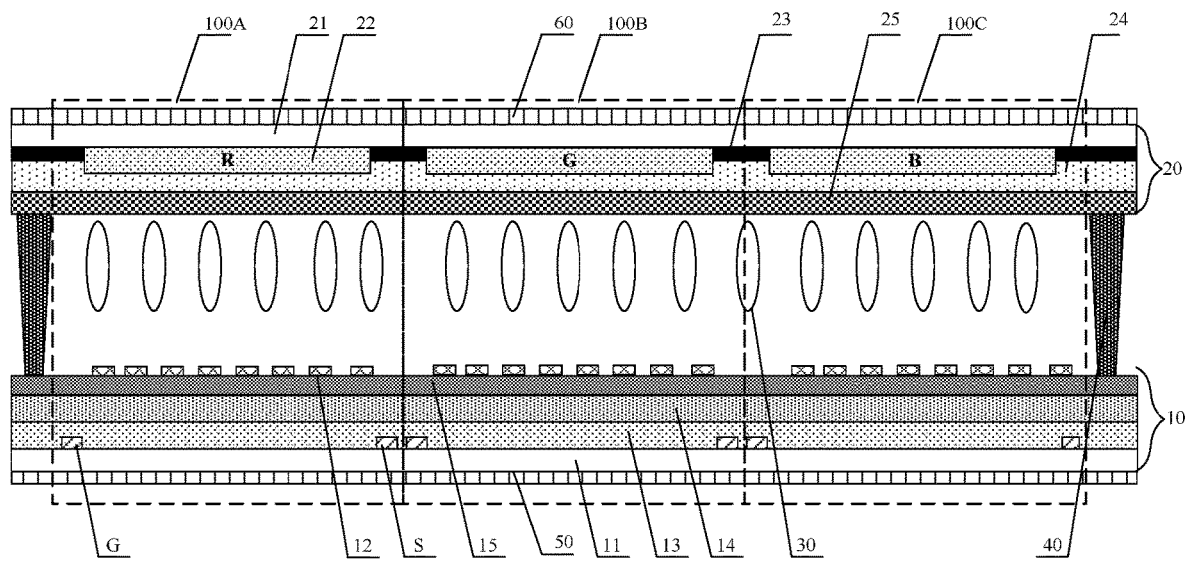
FIG. 8 is a schematic diagram of a structure of a display panel in accordance with another exemplary embodiment.

FIG. 8 is a schematic diagram of a structure of a display panel in accordance with another exemplary embodiment. As shown in FIG. 8, in an exemplary embodiment, the display panel further includes a liquid crystal layer 30 and a spacer 40 disposed between the first substrate 10 and the second substrate 20, a first polarizer 50 and a second polarizer 60.

In an exemplary embodiment, an absolute value of a difference between a refractive index of a manufacturing material of the liquid crystal layer 30 for extraordinary light and a refractive index of the manufacturing material of the liquid crystal layer 30 for ordinary light is greater than or equal to 0.3. Such a design can reduce the thickness of the liquid crystal layer, thereby reducing crosstalk between adjacent pixel electrodes and improving the display effect.

In an exemplary embodiment, the first polarizer 50 is arranged on one side of the first substrate 10 away from the second substrate 20, the second polarizer 60 is arranged on one side of the second substrate 20 away from the first substrate 10, and a polarization direction of the first polarizer 50 is perpendicular to a polarization direction of the second polarizer 60.

When the pixel electrode of an odd ordinal number is arranged in a different layer from the pixel electrodes of an even ordinal number in each sub-pixel, the liquid crystal layer located in any position can be controlled, enabling more accurate control.

The structure of a display panel in accordance with an exemplary embodiment is described below through a preparation process of a display substrate. "Patterning process" includes film layer deposition, photoresist coating, mask exposure, development, etching, photoresist stripping, etc. Any one or more of sputtering, evaporation and chemical vapor deposition may be used for deposition, any one or more of spray coating and spin coating may be used for coating, and any one or more of dry etching and wet etching may be used for etching. A "thin film" refers to a layer of thin film manufactured with a certain material on a base substrate using a deposition or coating process. If the "thin film" does not need the patterning process in the entire manufacturing process, the "thin film" may also be called a "layer". If the "thin film" needs the patterning process in the entire manufacturing process, the "thin film" is called a "thin film" before the patterning process is performed and is called a "layer" after the patterning process is performed. "A and B being arranged in the same layer" in the present disclosure means that A and B are formed simultaneously through a single patterning process.

FIGS. 9 to 15 are schematic diagrams of a preparation process of a display panel in accordance with an exemplary embodiment. FIGS. 9 to 15 illustrate a layout structure of a sub-pixel of the display substrate. Taking the case where one sub-pixel includes 8 pixel electrodes as an example, the structure of a display panel in accordance with an exemplary embodiment is described below through a preparation process of a display panel in conjunction with FIGS. 9 to 15.

(1) A first metal layer is formed, which includes: depositing a first insulating thin film on a first base substrate, patterning the first insulating thin film through a patterning process to form a first insulating layer, depositing a first metal thin film on the first insulating layer, and patterning the first metal thin film through a patterning process to form the first metal layer. The first metal layer includes the scan signal lines S and the gate electrodes 161 of all the transistors, as shown in FIG. 9.

Figure 9:
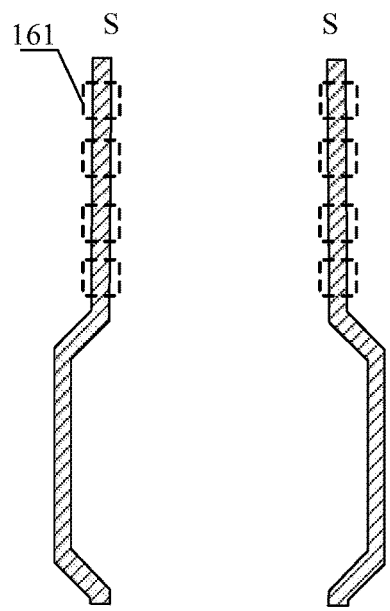
FIGS. 9 to 15 are schematic diagrams of a preparation process of a display panel in accordance with an exemplary embodiment.

As shown in FIG. 9, the gate electrodes 161 of all the transistors and the scan signal lines S are an integrally formed structure.

Figure 10:
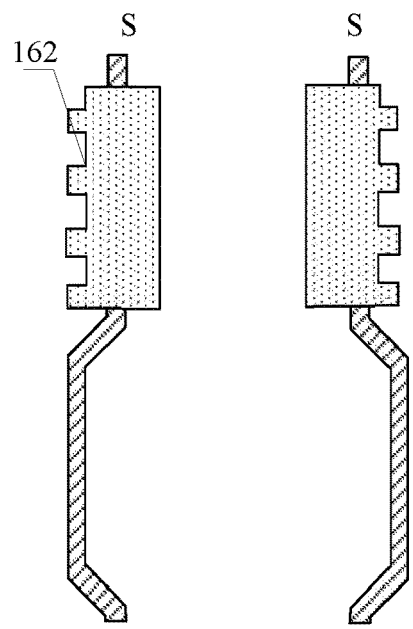

(2) An active layer is formed, which includes: depositing a second insulating thin film on the first base substrate, on which the first metal layer is formed, patterning the second insulating thin film through a patterning process to form a second insulating layer overlying the first metal layer, depositing a semiconductor thin film on the second insulating layer, and patterning the semiconductor thin film through a patterning process to form the active layer. The active layer includes the active layers 162 of all the transistors, as shown in FIG. 10.

(3) A second metal layer is formed, which includes: depositing a second metal thin film on the first base substrate, on which the active layer is formed, and patterning the second metal thin film through a patterning process to form the second metal layer. The second metal layer includes the data signal lines D and the source electrodes 163 and the drain electrodes 164 of all the transistors, as shown in FIG. 11.

Figure 11:
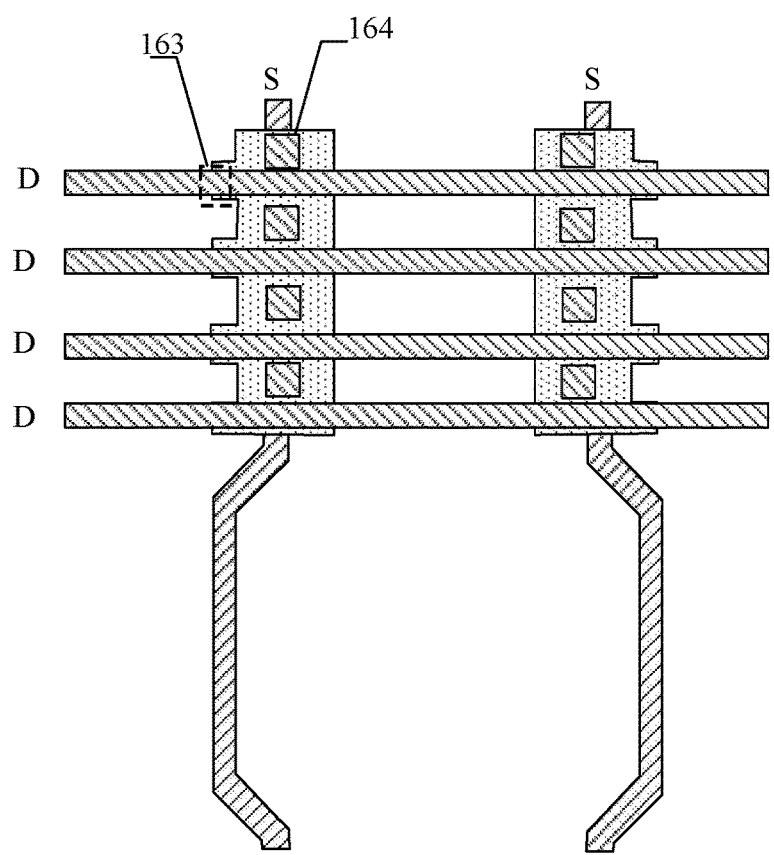

As shown in FIG. 11, the source electrodes 163 of all the transistors and the data signal lines D are an integrally formed structure.

Figure 12:
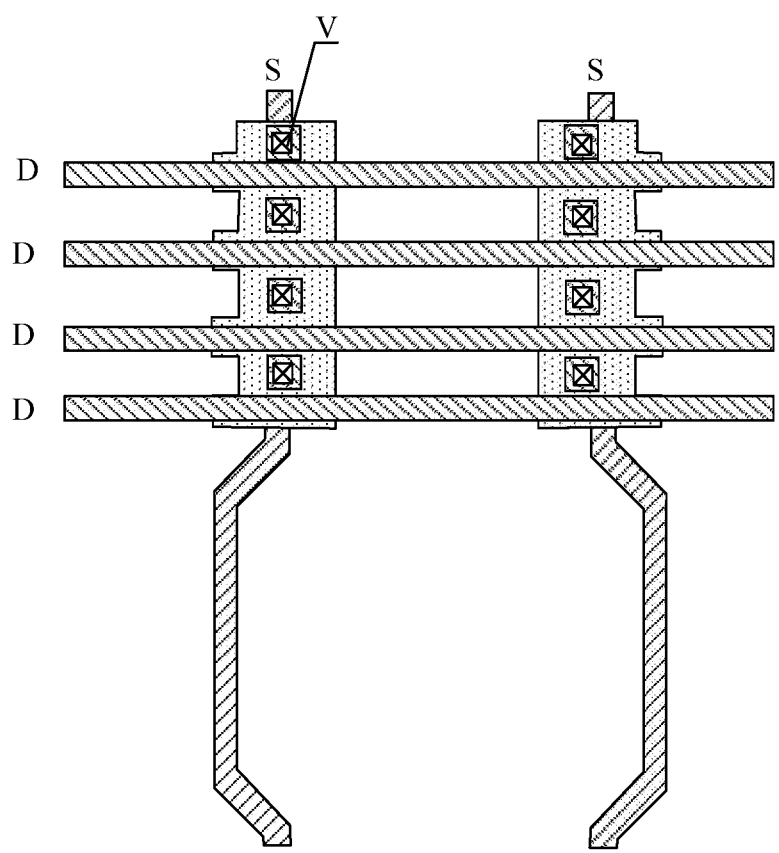

(4) A planarization layer is formed, which includes: coating a planarization thin film on the second metal layer, and patterning the planarization thin film through a photolithography process to form the planarization layer. The planarization layer is provided with via holes V exposing the drain electrodes of all the transistors, as shown in FIG. 12.

Figure 13:
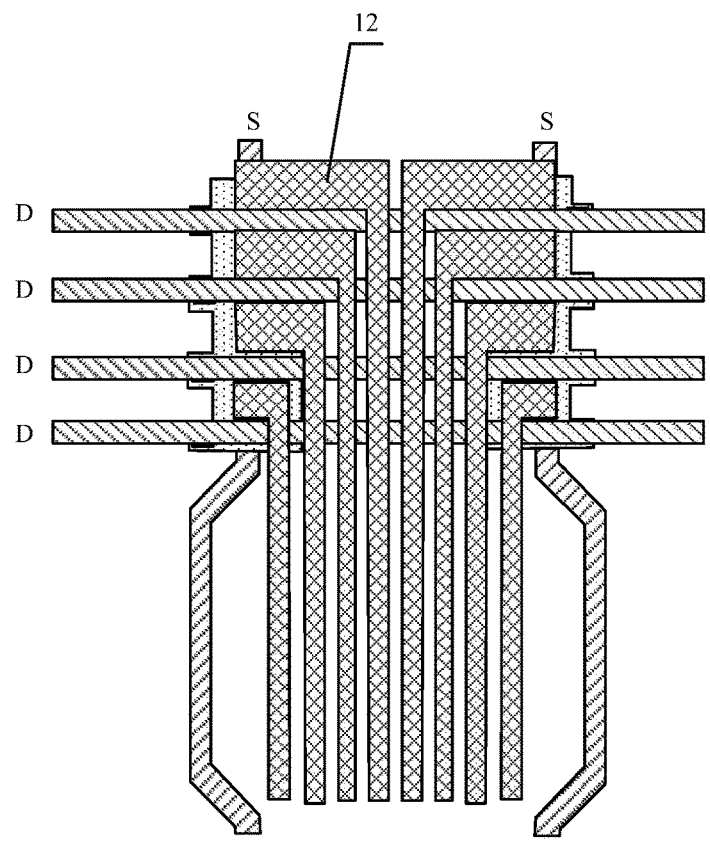

(5) Pixel electrodes are formed, which includes: depositing a transparent conductive material on the planarization layer, and patterning the transparent conductive material through a patterning process to form the pixel electrodes 12, so as to form a first substrate, as shown in FIG. 13.

Figure 14:
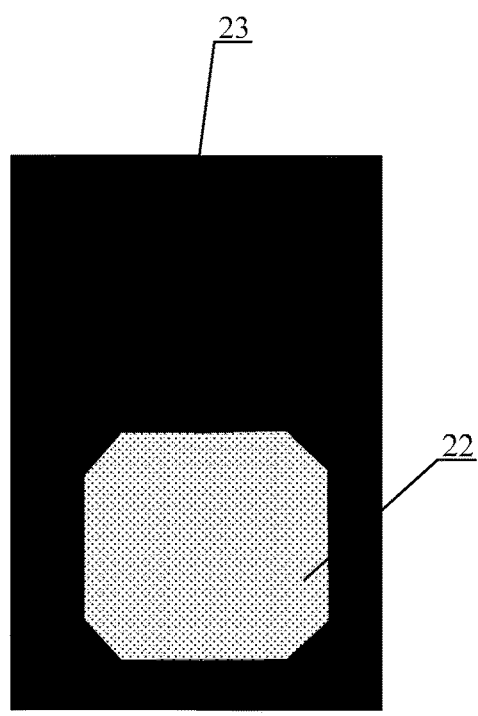

(6) A second substrate is formed, which includes: forming a black matrix layer 23 and a color filter layer on the second base substrate, forming a first adhesive layer on the second base substrate, on which the black matrix layer 23 and the color filter layer are formed, and forming a common electrode on the first adhesive layer, as shown in FIG. 14.

Figure 15:
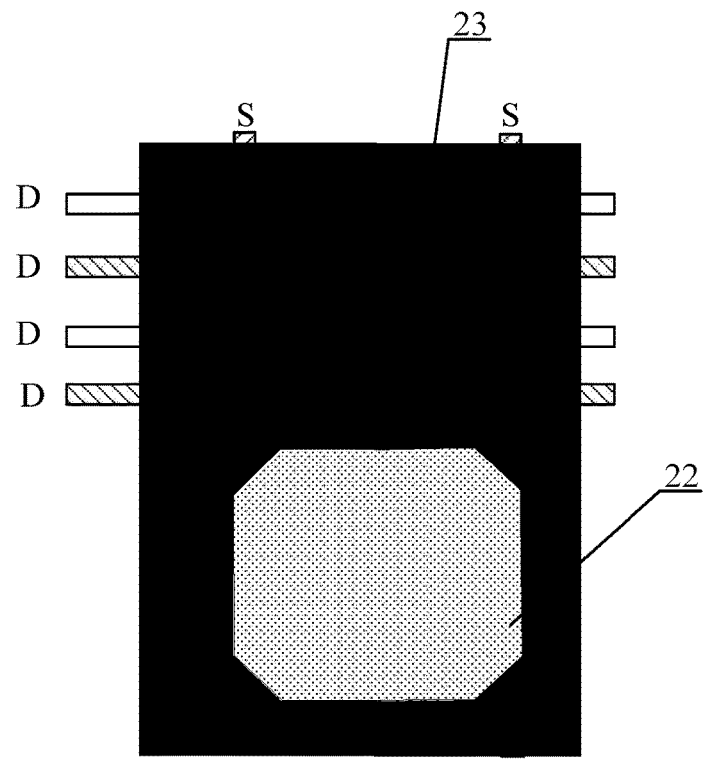

(7) The first substrate is cell-aligned with the second substrate, and a first polarizer is formed on the first substrate and a second polarizer is formed on the second substrate, as shown in FIG. 15.

In an exemplary embodiment, the first metal layer and the second metal layer may be made of a metal material, such as any one or more of argentum (Ag), copper (Cu), aluminum (Al) and molybdenum (Mo), or an alloy material of the above metals, such as an aluminum neodymium (AlNd) alloy or a molybdenum niobium (MoNb) alloy, and may be a mono-layer structure or a multi-layer composite structure, such as Mo/Cu/Mo, etc.

In an exemplary embodiment, the first insulating layer and the second insulating layer may be made of any one or more of silicon oxide (SiOx), silicon nitride (SiNx) and silicon oxynitride (SiON), and may be a mono-layer, a multi-layer or a composite layer. The first insulating layer is referred to as a buffer layer, which is configured to improve the water and oxygen resistance ability of the base substrate. The second insulating layer is referred to as a gate insulating layer.

In an exemplary embodiment, the planarization layer may be made of an organic material.

In an exemplary embodiment, the thickness of the first insulating layer is 3000 angstroms to 5000 angstroms, and the thickness of the second insulating layer is 1000 angstroms to 2000 angstroms.

In an exemplary embodiment, the thickness of the first metal layer is 3000 angstroms to 5000 angstroms, and the thickness of the second metal layer is 3000 angstroms to 9000 angstroms.

Figure 16:
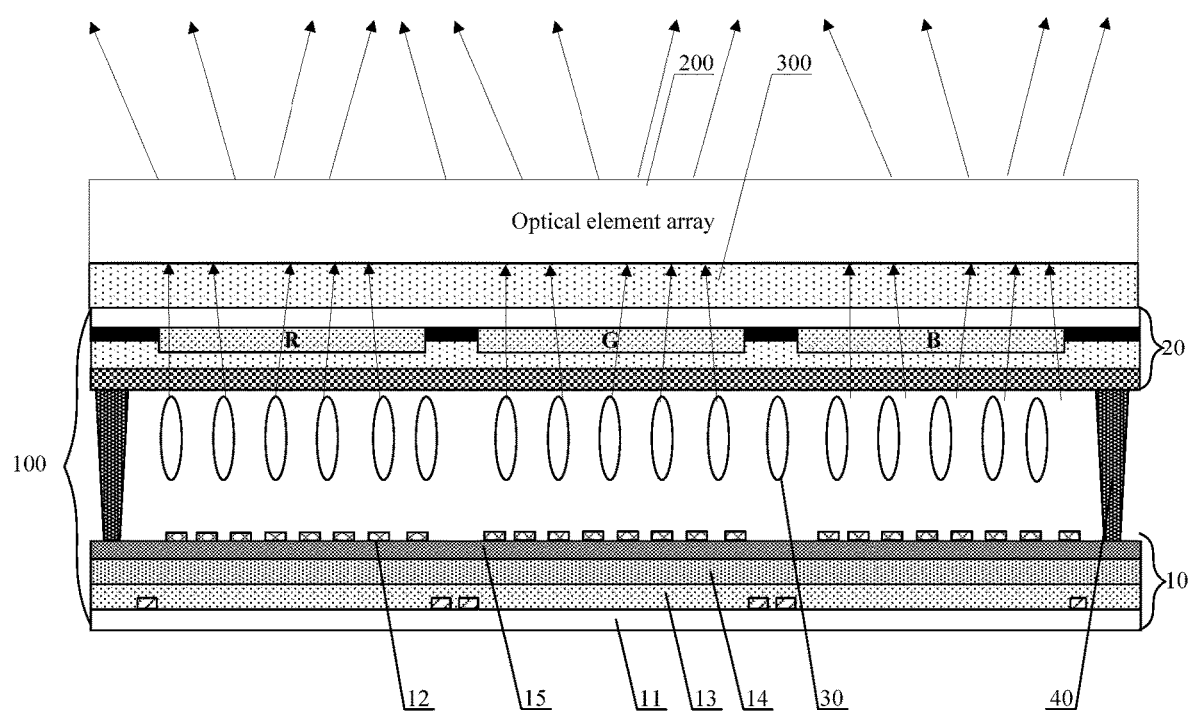
FIG. 16 is a schematic diagram of a structure of a display apparatus in accordance with an embodiment of the present disclosure.

FIG. 16 is a schematic diagram of a structure of a display apparatus in accordance with an embodiment of the present disclosure. As shown in FIG. 16, the display apparatus in accordance with an embodiment of the present disclosure includes a display panel 100, an optical element array 200 and an eyeball tracking structure.

The display panel 100 is configured to emit light towards the optical element array 200, such that the light passes through the optical element array 200 and then reaches human eyes; the optical element array 200 is located at a light exiting side of the display panel 100; and the eyeball tracking structure is electrically connected to the display panel 100 and is configured to acquire position information of the human eyes.

The display panel is the display panel in accordance with any one of the preceding embodiments, and their implementation principles and implementation effects are similar, which will not be repeated herein.

Figure 17:
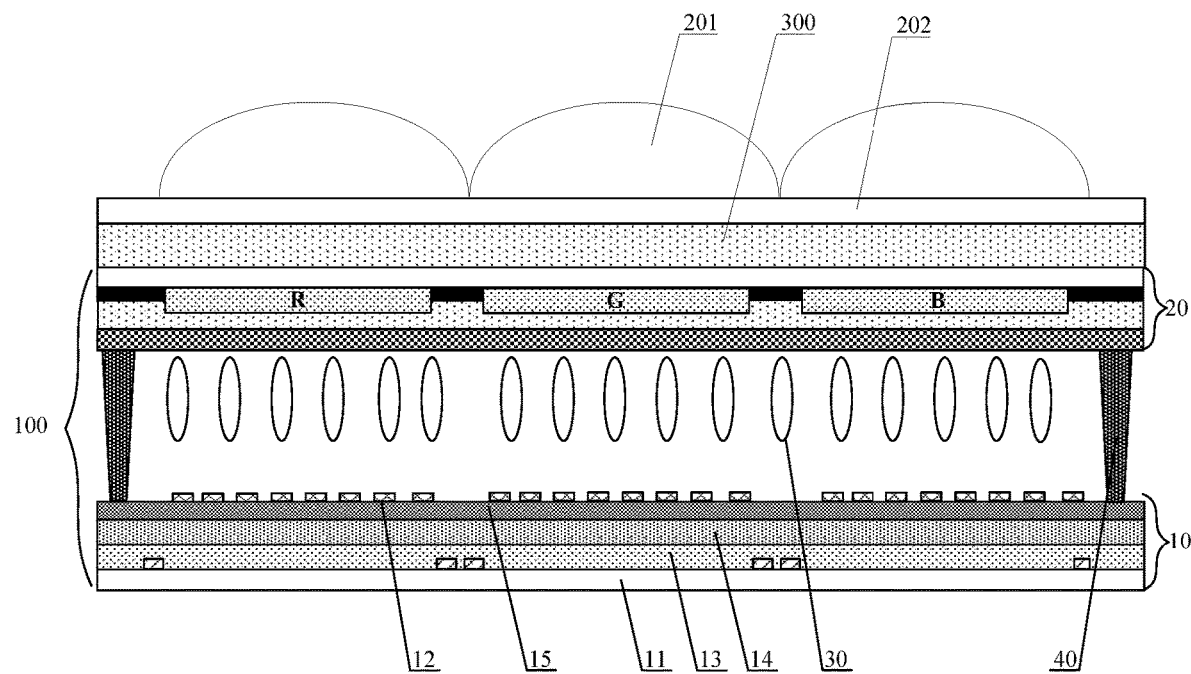
FIG. 17 is a schematic diagram of a structure of a display apparatus in accordance with an exemplary embodiment.

FIG. 17 is a schematic diagram of a structure of a display apparatus in accordance with an exemplary embodiment. As shown in FIG. 17, the optical element array 200 in the display apparatus in accordance with an exemplary embodiment includes a plurality of microlenses 201. The display panel includes a plurality of sub-pixels.

A dimension of a microlens along the first direction is less than or equal to a dimension of a sub-pixel along the first direction, and a dimension of the microlens along the second direction is less than or equal to a dimension of the sub-pixel along the second direction. FIG. 17 illustrates an example in which the dimension of the microlens along the first direction is equal to the dimension of the sub-pixel along the first direction.

In an exemplary embodiment, the optical element array 200 may further include a third base substrate 202 arranged at one side of the plurality of microlenses 201 close to the display panel, and the plurality of microlenses 201 are arranged on the third base substrate 202.

In an exemplary embodiment, each sub-pixel may correspond to at least one microlens, and an orthographic projection of each sub-pixel on the third base substrate covers an orthographic projection of the corresponding at least one microlens on the third base substrate.

In an exemplary embodiment, the number of microlenses corresponding to each sub-pixel depends on the shape and size of the sub-pixel and the microlens.

In an exemplary embodiment, the microlens may be in a shape of a hemisphere.

In an exemplary embodiment, the area of the optical element array may be smaller than the area of the display panel.

Figure 18:
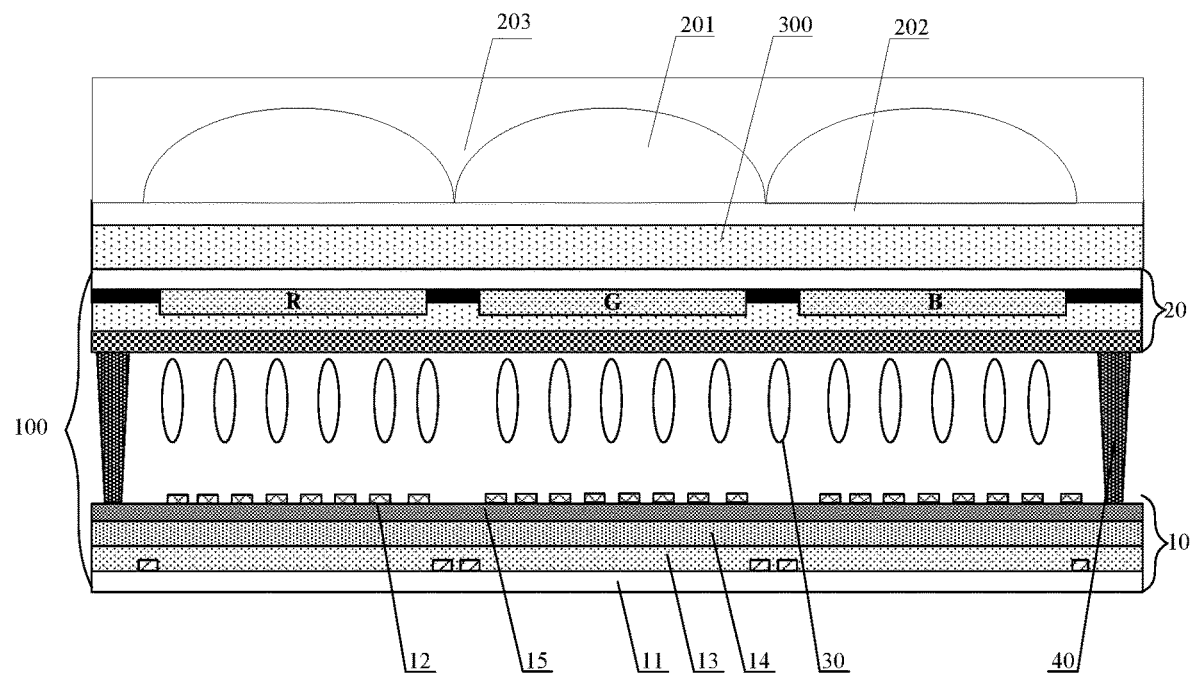
FIG. 18 is a schematic diagram of a structure of a display apparatus in accordance with another exemplary embodiment.

FIG. 18 is a schematic diagram of a structure of a display apparatus in accordance with another exemplary embodiment. As shown in FIG. 18, the optical element array 200 in the display apparatus in accordance with the exemplary embodiment includes a third base substrate 202 and a first optical structure and a second optical structure 203 disposed on the third base substrate, the second optical structure 203 being arranged on one side of the first optical structure away from the display panel.

In an exemplary embodiment, the first optical structure includes a plurality of microlenses 201. The second optical structure 203 is a planar structure, and is provided with a plurality of grooves. The grooves are in a one-to-one correspondence with the microlenses, and the microlenses are embedded in the corresponding grooves.

In an exemplary embodiment, the dimension of the microlens along the first direction is less than or equal to the dimension of the sub-pixel along the first direction, and the dimension of the microlens along the second direction is less than or equal to the dimension of the sub-pixel along the second direction. FIG. 18 illustrates an example in which the dimension of the microlens along the first direction is equal to the dimension of the sub-pixel along the first direction.

In an exemplary embodiment, a refractive index of a manufacturing material of the second optical structure is smaller than a refractive index of a manufacturing material of the microlens.

As shown in FIGS. 16 to 18, the display apparatus in accordance with an exemplary embodiment further includes a second adhesive layer 300. The second adhesion layer 300 is arranged on one side of the optical element array close to the display panel 100. The second adhesion layer 300 can adhere the optical element array onto the display panel, thereby ensuring the display effect of the display apparatus.

Figure 19:
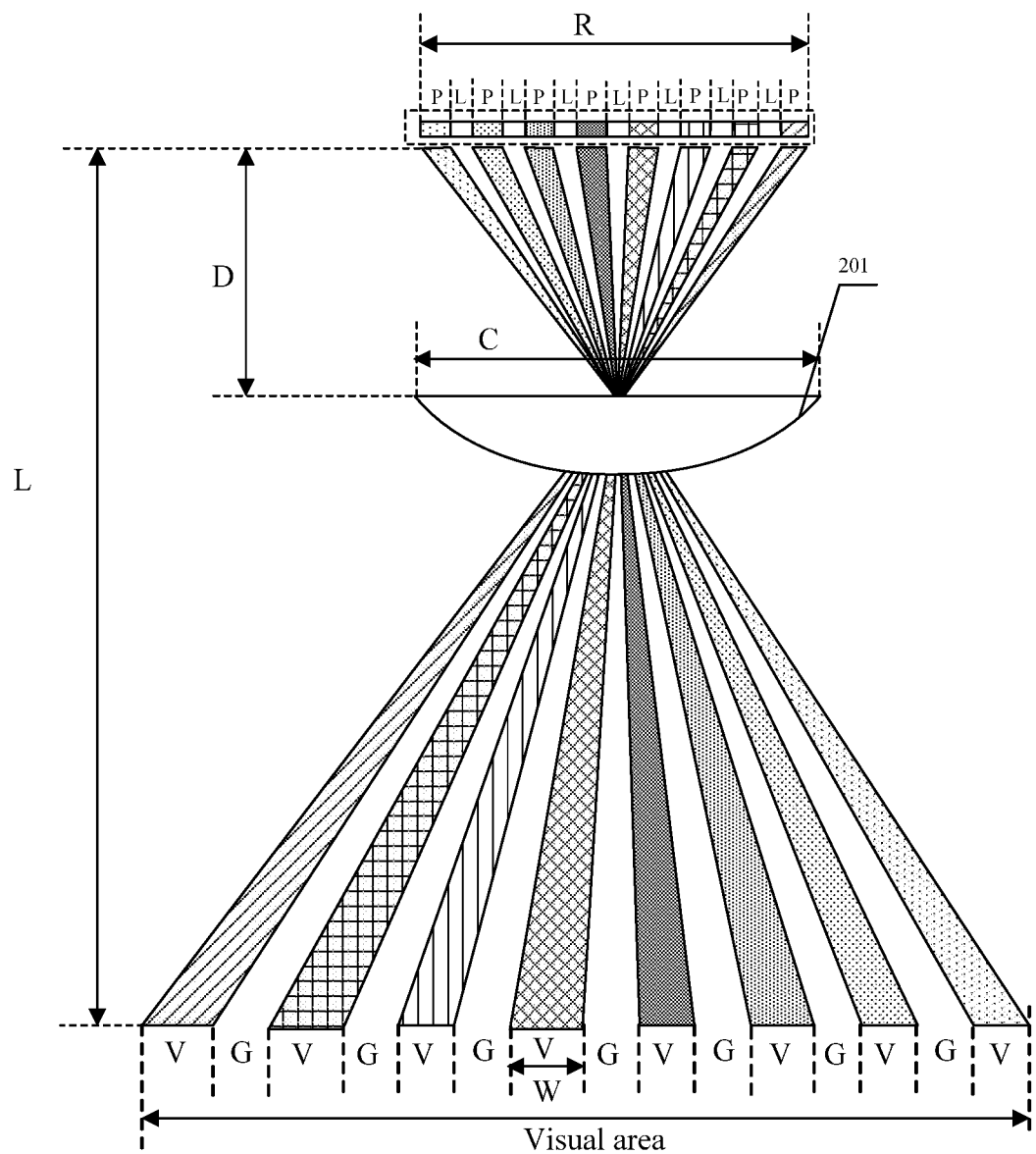
FIG. 19 is an optical path diagram of a display apparatus in accordance with an exemplary embodiment.

FIG. 19 is an optical path diagram of a display apparatus in accordance with an exemplary embodiment. As shown in FIG. 19, in an exemplary embodiment, when all pixel electrodes in each sub-pixel are arranged in the same layer, the display apparatus includes a plurality of electrode control regions P and a plurality of electrode transition regions L. The plurality of electrode control regions P and the plurality of electrode transition regions L are arranged in a staggered manner. Each of the electrode control regions P includes a pixel electrode, and the electrode transition regions are in a one-to-one correspondence with intervals between adjacent pixel electrodes. FIG. 19 illustrates an example in which there are 8 electrode control regions P and 7 electrode transition regions L.

An area viewed by the human eyes is a visual area. The visual area includes a plurality of view angle control regions V and a plurality of view angle transition regions G, the plurality of view angle control regions V and the plurality of view angle transition regions G being arranged in a staggered manner. The view angle control regions V are in a one-to-one correspondence with the electrode control regions P, and the view angle control regions V are areas formed by light emitted from the corresponding electrode control regions P after transmission through the microlenses 201 in the optical element array; and the view angle transition regions G are in a one-to-one correspondence with the electrode transition regions L, and the view angle transition regions G are areas formed by light emitted from the corresponding electrode transition regions L after transmission through the microlenses 201 in the optical element array. P0 is the length of the electrode control region P along the first direction, and is equal to the length of the pixel electrode included in the electrode control region P along the first direction, R is the sum of the lengths of all the electrode control regions and the electrode transition regions along the first direction, D is a distance between a surface of the display panel close to the microlens and the microlens 201, C is the length of the surface of the microlens close to the display panel along the first direction, L is a distance between the surface of the display panel close to the microlens and the visual area, and W is the length of the view angle control region V along the first direction. The aforementioned parameters satisfy the following formula:

$$D = \frac{P0 * L}{W + P}$$
$$\frac{C}{R} = \frac{L - D}{L}$$

Assuming that the pupillary distance of the human eyes is 6.5 cm, when the thicknesses of the second base substrate, the second polarizer and the second adhesive layer are 300 microns and L=2.17 meters, the display apparatus can meet three-dimensional viewing, and in such a case, W is a half of the pupillary distance of the human eyes, that is, the human eyes can see another view angle when they move by 3 cm. When L=4.33 meters, the display apparatus can still meet the three-dimensional viewing, and in such a case, W is the pupillary distance of the human eyes, that is, the human eyes can see another view angle whenever they move by 6.5 cm. When L=300 mm, two adjacent view angles can enter a single human eye to realize monocular stereopsis, which may solve the problem of three-dimensional focusing-convergence contradiction of naked-eyes. In such a case, the human eyes can see a different view angle whenever they move by 2 mm. When the performance index is measured by angle, a different view angle can be viewed when the viewing angle of the human eyes changes by 0.86°.

In a third aspect, an embodiment of the present disclosure further provides a method for driving a display apparatus, which is used for driving a display apparatus, the display apparatus including a plurality of pixel electrodes. The method for driving a display apparatus in accordance with an embodiment of the present disclosure includes the following steps.

In step S1, position information of human eyes is acquired.

Step S1 may include: an eyeball tracking device acquiring the position information of the human eyes.

In step S2, driving signals are provided to the plurality of pixel electrodes according to the position information of the human eyes.

The display apparatus is the display apparatus in accordance with any one of the preceding embodiments, and their implementation principles and implementation effects are similar, which will not be repeated herein.

In an exemplary embodiment, as shown in FIG. 19, when all pixel electrodes in each sub-pixel are arranged in the same layer, the position information includes a view angle control region V or a view angle transition region G. When different voltage signals are applied to adjacent pixel electrodes in a sub-pixel, a liquid crystal deflection direction of two electrode control regions where the adjacent pixel electrodes are located is different from that of the electrode transition region between the two electrode control regions, and the transmittance of the electrode transition region between the two electrode control regions is different from the transmittance of the two electrode control regions, so that crosstalk will occur in the electrode transition region. Therefore, referring to FIG. 19, in an exemplary embodiment, the human eyes include a first eyeball and a second eyeball; and step S2 may include: when either of the eyeballs is located in a view angle control region, providing a corresponding driving signal to the pixel electrode included in the electrode control region corresponding to the view angle control region in which the eyeball is located, or when either of the eyeballs is located in a view angle transition region, providing the same driving signals to the pixel electrodes included in the electrode control regions at both sides of the electrode transition region corresponding to the view angle transition region in which the eyeball is located.

In an exemplary embodiment, when either of the eyeballs is located in a view angle control region, the corresponding driving signal provided to the pixel electrode included in the electrode control region corresponding to the view angle control region in which the eyeball is located depends on contents displayed on the display panel.

When either of the eyeballs is located in a view angle control region, a corresponding driving signal is provided to the pixel electrode included in the electrode control region corresponding to the view angle control region in which the eyeball is located, so that the human eyes can see the correct image. When either of the eyeballs is located in a view angle transition region, the same driving signals are provided to the pixel electrodes included in the electrode control regions at both sides of the electrode transition region corresponding to the view angle transition region in which the eyeball is located, so that the view angle transition region, in which the eyeball is located, is controllable, which may prevent the human eyes from seeing crosstalk information, such that the human eyes see the correct image.

In an exemplary embodiment, when pixel electrodes of odd ordinal numbers are arranged in a different layer from pixel electrodes of even ordinal numbers in each sub-pixel, the display apparatus includes a plurality of electrode control regions each including a pixel electrode. An area viewed by the human eyes is a visual area. The visual area includes a plurality of view angle control regions. The view angle control regions are in a one-to-one correspondence with the electrode control regions, and the view angle control regions are areas formed by light emitted from the corresponding electrode control regions after transmission through the optical element array.

Figure 20:
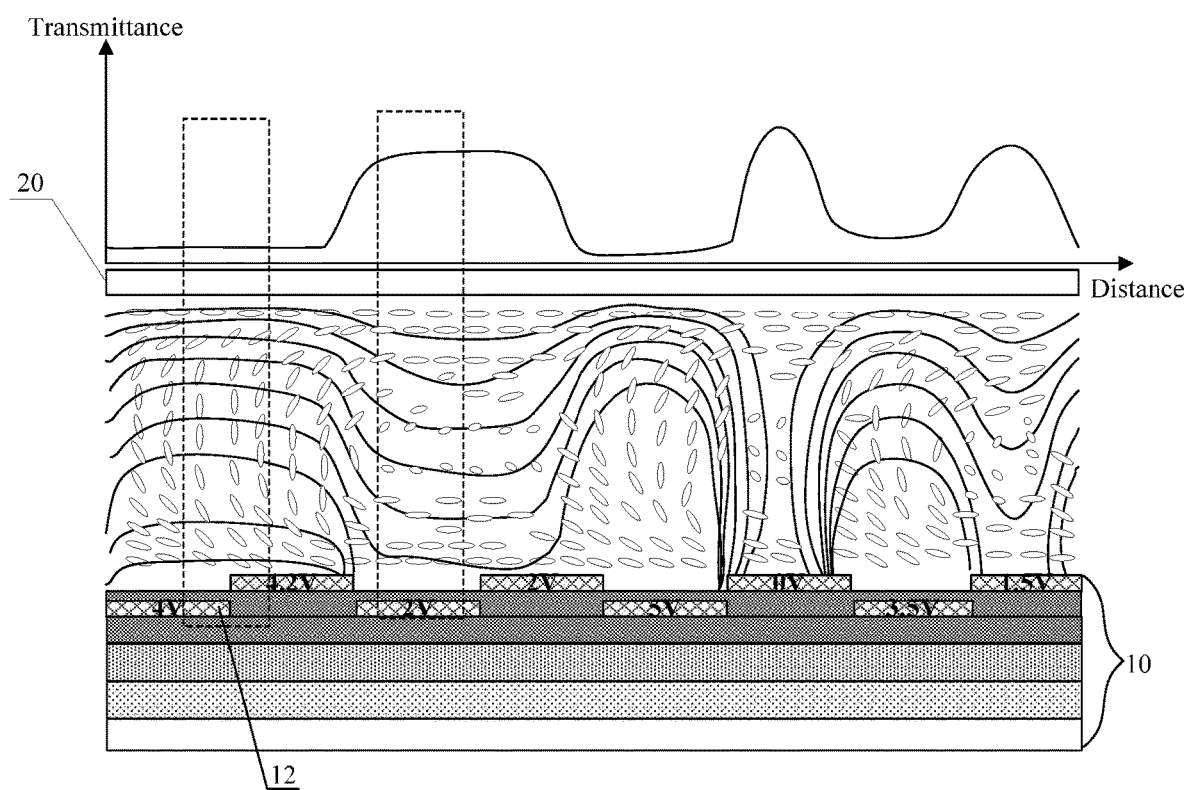
FIG. 20 shows a correlation between driving signals applied to pixel electrodes and transmittance when a pixel electrode of an odd ordinal number is arranged in a different layer from a pixel electrode of an even ordinal number in each sub-pixel.

In an exemplary embodiment, FIG. 20 shows a correlation between driving signals applied to pixel electrodes and transmittance when a pixel electrode of an odd ordinal number is arranged in a different layer from a pixel electrode of an even ordinal number in each sub-pixel. When a pixel electrode of an odd ordinal number is arranged in a different layer from a pixel electrode of an even ordinal number in each sub-pixel, the position information includes: between two view angle control regions or in one view angle control region. As shown in FIG. 20, when there is a significant difference between the driving signals applied to an ith pixel electrode and an i+1th pixel electrode, i.e., when there is a significant voltage difference between the ith pixel electrode and the i+1th pixel electrode, the transmittance of some areas of the display panel exhibits a gradual distribution, resulting in crosstalk in the display panel. When the human eyes just gaze at an area where crosstalk exists, the human eyes will be unable to see the correct image information. Therefore, referring to FIG. 20, the human eyes include a first eyeball and a second eyeball, and step S2 includes: when either of the eyeballs is located between two view angle control regions, providing corresponding driving signals to the pixel electrodes included in the electrode control regions corresponding to the two view angle control regions between which the eyeball is located, wherein an absolute value of a difference between voltages of the corresponding driving signals provided to the pixel electrodes included in the electrode control regions corresponding to the two view angle control regions between which the eyeball is located is less than or equal to a threshold difference; or when either of the eyeballs is located in a view angle control region, providing a corresponding driving signal to the pixel electrode included in the electrode control region corresponding to the view angle control region in which the eyeball is located.

In an exemplary embodiment, when either of the eyeballs is located in a view angle control region, the driving signal provided to the pixel electrode included in the electrode control region corresponding to the view angle control region in which the eyeball is located depends on contents displayed on the display panel.

Since the plurality of pixel electrodes are arranged in different layers, even if the same driving signals are applied to the pixel electrodes, transmittance curves of the electrode control regions where the pixel electrodes are located are slightly different. Therefore, in practical applications, there may be a difference in the driving signal applied to each pixel electrode, in order to maintain the same transmittance. Therefore, when either of the eyeballs is located between two view angle control regions, corresponding driving signals are provided to the pixel electrodes included in the electrode control regions corresponding to the two view angle control regions between which the eyeball is located, wherein the absolute value of the difference between the voltages of the corresponding driving signals provided to the pixel electrodes included in the electrode control regions corresponding to the two view angle control regions between which the eyeball is located is less than or equal to a threshold difference. Its purpose is to eliminate the difference in the transmittance curve caused by the arrangement of the pixel electrodes in different layers, and to reduce crosstalk and improve the display effect by adjusting the voltages of the driving signals properly.

In an exemplary embodiment, the threshold difference may be less than or equal to 0.2 V. For example, the threshold difference may be 0, that is, when either of the eyeballs is located between two view angle control regions, the driving signals provided to the pixel electrodes included in the electrode control regions corresponding to the two view angle control regions between which the eyeball is located may be the same or approximately the same driving signals.

When either of the eyeballs is located between two view angle control regions, providing the same or approximately the same driving signals to the pixel electrodes included in the electrode control regions corresponding to the two view angle control regions between which the eyeball is located may avoid that crosstalk occurs in the information viewed by the human eyes, and may ensure that the human eyes can see the correct image information. When either of the eyeballs is located in a view angle control region, providing a corresponding driving signal to the pixel electrode included in the electrode control region corresponding to the view angle control region in which the eyeball is located may enable the human eyes to view the correct image.

FIG. 20 illustrates an example in which each sub-pixel includes 8 pixel electrodes 12, a driving signal with a voltage value of 4.2 V is provided to a first pixel electrode, a driving signal with a voltage value of 4 V is provided to a second pixel electrode, a driving signal with a voltage value of 2 V is provided to a third pixel electrode, a driving signal with a voltage value of 2 V is provided to a fourth pixel electrode, a driving signal with a voltage value of 5 V is provided to a fifth pixel electrode, a driving signal with a voltage value of 0 V is provided to a sixth pixel electrode, a driving signal with a voltage value of 3.5 V is provided to a seventh pixel electrode, and a driving signal with a voltage value of 1.2 V is provided to an eighth pixel electrode. As shown in FIG. 20, approximately the same driving signals are provided to the first pixel electrode and the second pixel electrode, and the transmittance of the electrode control region in which the first pixel electrode is located is the same as the transmittance of the electrode control region in which the second pixel electrode is located. The same driving signals are provided to the third pixel electrode and the fourth pixel electrode, and the transmittance of the electrode control region in which the third pixel electrode is located is the same as the transmittance of the electrode control region in which the fourth pixel electrode is located. Due to the relatively large difference in the driving signals provided to the second pixel electrode and the third pixel electrode, the transmittance of some areas of the electrode control regions in which the second pixel electrode and the third pixel electrode are located is different from the transmittance of other areas, and exhibits a gradual distribution. Similarly, due to the relatively large difference in the driving signals provided to the fourth pixel electrode and the fifth pixel electrode, the transmittance of some areas of the electrode control regions in which the fourth pixel electrode and the fifth pixel electrode are located is different from the transmittance of other areas, and exhibits a gradual distribution; due to the relatively large difference in the driving signals provided to the fifth pixel electrode and the sixth pixel electrode, the transmittance of some areas of the electrode control regions in which the fifth pixel electrode and the sixth pixel electrode are located is different from the transmittance of other areas, and exhibits a gradual distribution; due to the relatively large difference in the driving signals provided to the sixth pixel electrode and the seventh pixel electrode, the transmittance of some areas of the electrode control regions in which the sixth pixel electrode and the seventh pixel electrode are located is different from the transmittance of other areas, and exhibits a gradual distribution; and due to the relatively large difference in the driving signals provided to the seventh pixel electrode and the eighth pixel electrode, the transmittance of some areas of the electrode control regions in which the seventh pixel electrode and the eighth pixel electrode are located is different from the transmittance of other areas, and exhibits a gradual distribution. Therefore, for example, when an eyeball is located between two view angle control regions corresponding to the first pixel electrode and the second pixel electrode, providing driving signals of 4 V and 4.2 V to the first pixel electrode and the second pixel electrode, respectively may enable the eyeball to see the display effect with reduced crosstalk; and when an eyeball is located between two view angle control regions corresponding to the third pixel electrode and the fourth pixel electrode, providing driving signals of 2 V to the third pixel electrode and the fourth pixel electrode may enable the eyeball to see the display effect with reduced crosstalk.

In an exemplary embodiment, the method for driving a display apparatus is applicable to the case of one person viewing, or is applicable to the case of multiple people viewing. In the case of multiple people viewing, different people are located in different positions, i.e., eyeballs of different people are located in different visual areas of the display apparatus, and in such a case, the driving signals are provided to the pixel electrodes according to the positions of the eyeballs of different people by using the method for driving a display apparatus provided above.

In an exemplary embodiment, when the display apparatus displays planar information, the same driving signals may be provided to all pixel electrodes in each sub-pixel. When the same driving signals are applied to all pixel electrodes in each sub-pixel such that the same information is displayed in each sub-pixel, it can be ensured that the viewer sees the same display information with both eyes at any position, which may meet the requirement of planar display.

The accompanying drawings of the present disclosure relate only to the structures involved in the embodiments of the present disclosure, and for the other structures, reference may be made to conventional designs.

For the sake of clarity, the thickness and size of layers or microstructures are exaggerated in the drawings used to describe the embodiments of the present disclosure. It may be understood that when an element such as a layer, film, region or substrate is referred to as being "on" or "under" another element, the element may be "directly" "on" or "under" the another element, or there may be an intervening element.

Although the embodiments disclosed in the present disclosure are described as above, the described contents are only embodiments which are used in order to facilitate understanding of the present disclosure, and are not intended to limit the present disclosure. Any skilled person in the art to which the present disclosure pertains may make any modifications and alterations in forms and details of implementation without departing from the spirit and scope of the present disclosure. However, the patent protection scope of the present disclosure should still be subject to the scope defined by the appended claims.

The invention claimed is:

1. A display panel, comprising a plurality of sub-pixels arranged in an array, the display panel comprising a first substrate and a second substrate which are arranged opposite to each other; the first substrate comprising a first base substrate and a plurality of pixel electrodes arranged on the first base substrate; and each sub-pixel comprising at least two pixel electrodes, wherein a plurality of sub-pixels constitute one pixel;

the second substrate comprises a second base substrate and a color filter layer arranged on the second base substrate, the color filter layer comprising a plurality of optical filters arranged in a matrix;

each sub-pixel further comprises an optical filter of a planar structure; and optical filters of a plurality of sub-pixels located in a same pixel have different colors; and in each sub-pixel, an orthographic projection of the optical filter on the first base substrate overlaps at least partially with an orthographic projection of each pixel electrode on the first base substrate.

2. The display panel according to claim 1, wherein the first substrate further comprises an array structure layer arranged on one side of the pixel electrodes close to the first base substrate;

the array structure layer comprises a plurality of transistors in a one-to-one correspondence with the pixel electrodes, the pixel electrodes being electrically connected to the corresponding transistors; and each sub-pixel further comprises transistors corresponding to the at least two pixel electrodes.

3. The display panel according to claim 2, wherein the second substrate further comprises a black matrix layer, a first adhesive layer and a common electrode, which are arranged on the second base substrate and are arranged in the same layer as the color filter layer, the black matrix layer comprising a plurality of black matrix structures;

each sub-pixel further comprises a black matrix structure provided with an opening area, the optical filter being located in the opening area and the black matrix structures of adjacent sub-pixels being connected to each other;

in each sub-pixel, an orthographic projection of the black matrix structure on the first base substrate covers orthographic projections of all the transistors on the first base substrate, and the orthographic projection of the black matrix structure on the first base substrate overlaps at least partially with the orthographic projection of each pixel electrode on the first base substrate; and the first adhesive layer is arranged on one side of the color filter layer close to the first substrate, and the common electrode is arranged on one side of the first adhesive layer close to the first substrate.

4. The display panel according to claim 3, wherein the first substrate further comprises a plurality of data signal lines extending along a first direction and a plurality of scan signal lines extending along a second direction, which are arranged on the first base substrate; and an orthographic projection of the black matrix layer on the first base substrate covers orthographic projections of the data signal lines and the scan signal lines on the first base substrate, the first direction being perpendicular to the second direction.

5. The display panel according to claim 4, wherein the at least two pixel electrodes in each sub-pixel are arranged along the first direction;

each pixel electrode is in a shape of a broken line, and comprises a first connecting portion and a second connecting portion, the first connecting portion and the second connecting portion being both linear and being an integrally formed structure, the second connecting portion extending along the second direction;

the first connecting portion is connected to the transistor corresponding to the pixel electrode, and the orthographic projection of the black matrix structure on the first base substrate covers an orthographic projection of the first connecting portion on the first base substrate;

an orthographic projection of the second connecting portion on the first base substrate overlaps at least partially with the orthographic projection of the optical filter on the first base substrate, and the orthographic projection of the second connecting portion on the first base substrate overlaps at least partially with the orthographic projection of the black matrix structure on the first base substrate; and a width of the second connecting portion of each pixel electrode along the first direction is 1.3 microns to 1.7 microns.

6. The display panel according to claim 5, wherein each sub-pixel is electrically connected to two scan signal lines and M data signal lines respectively, the two scan signal lines are a first scan signal line and a second scan signal line respectively, the M data signal lines are a first data signal line to an Mth data signal line respectively, the at least two pixel electrodes arranged along the first direction in each sub-pixel are a first pixel electrode to a 2Mth pixel electrode sequentially, and a transistor corresponding to an ith pixel electrode is an ith transistor; the optical filter in each sub-pixel is an axisymmetric structure, and symmetry axes of the optical filter comprise a first symmetry axis and a second symmetry axis, the first symmetry axis extending along the first direction and the second symmetry axis extending along the second direction;

a first transistor to an Mth transistor are arranged along the second direction, an M+1th transistor to a 2Mth transistor are arranged along the second direction, a jth transistor and a j+Mth transistor are arranged along the first direction, and the jth transistor and the j+Mth transistor are mirror-symmetrical with respect to the second symmetry axis;

the first scan signal line is connected to gate electrodes of the first transistor to the Mth transistor respectively; the second scan signal line is electrically connected to gate electrodes of the M+1th transistor to the 2Mth transistor respectively, and the first scan signal line and the second scan signal line are mirror-symmetrical with respect to the second symmetry axis and are located at a first side and a second side of the optical filter respectively, the first side and the second side being opposite to each other; and the M data signal lines are located at a third side of the optical filter, the third side being different from the first side and the second side, and a jth data signal line is electrically connected to source electrodes of the jth transistor and the j+Mth transistor respectively, $M \geq 1$, $1 \leq i \leq 2M$, and $1 \leq j \leq M$.

7. The display panel according to claim 6, wherein all pixel electrodes in each sub-pixel are arranged in a same layer; and a distance between the second connecting portions of adjacent pixel electrodes is 1.4 microns to 1.6 microns.

8. The display panel according to claim 6, wherein in each sub-pixel, a pixel electrode of an odd ordinal number is arranged in a different layer from a pixel electrode of an even ordinal number;

a spacing between an orthographic projection of the ith pixel electrode on the first base substrate and an orthographic projection of an i+1th pixel electrode on the first base substrate is equal to 0;

the first substrate further comprises a first planarization layer and a second planarization layer; the first planarization layer is located on one side of the array structure layer away from the first base substrate, and the second planarization layer is located on one side of the first planarization layer away from the first base substrate;

the pixel electrode of an odd ordinal number is located between the first planarization layer and the second planarization layer, and the pixel electrode of an even ordinal number is located on one side of the second planarization layer away from the first base substrate; or the pixel electrode of an even ordinal number is located between the first planarization layer and the second planarization layer, and the pixel electrode of an odd ordinal number is located on one side of the second planarization layer away from the first base substrate.

9. The display panel according to claim 3, wherein the display panel further comprises: a liquid crystal layer arranged between the first substrate and the second substrate, a first polarizer and a second polarizer;

an absolute value of a difference between a refractive index of a manufacturing material of the liquid crystal layer for extraordinary light and a refractive index of the manufacturing material of the liquid crystal layer for ordinary light is greater than or equal to 0.3;

the first polarizer is arranged on one side of the first substrate away from the second substrate, and the second polarizer is arranged on one side of the second substrate away from the first substrate; and a polarization direction of the first polarizer is perpendicular to a polarization direction of the second polarizer.

* * * * *